United States Patent
Merlin et al.

(10) Patent No.: US 9,681,442 B2
(45) Date of Patent: Jun. 13, 2017

(54) SYSTEMS AND METHODS FOR SCHEDULING GROUP ACCESS IN WIRELESS NETWORKS

(71) Applicant: QUALCOMM Incorporated, San Diego, CA (US)

(72) Inventors: Simone Merlin, Solana Beach, CA (US); Hemanth Sampath, San Diego, CA (US); Gwendolyn Denise Barriac, Encinitas, CA (US); Amin Jafarian, San Diego, CA (US); Maarten Menzo Wentink, Naarden (NL); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 14/527,590

(22) Filed: Oct. 29, 2014

(65) Prior Publication Data

US 2015/0117369 A1 Apr. 30, 2015

Related U.S. Application Data

(60) Provisional application No. 61/898,436, filed on Oct. 31, 2013.

(51) Int. Cl.
*H04W 4/00* (2009.01)
*H04W 72/04* (2009.01)
(Continued)

(52) U.S. Cl.
CPC ... *H04W 72/0446* (2013.01); *H04W 74/0816* (2013.01); *H04W 72/121* (2013.01)

(58) Field of Classification Search
CPC ......... H04W 72/0446; H04W 74/0816; H04W 72/04
(Continued)

(56) References Cited

U.S. PATENT DOCUMENTS 6,262,980 B1 * 7/2001 Leung ................. H04L 41/0896
370/336
8,130,737 B2 3/2012 Singh et al.
(Continued)

FOREIGN PATENT DOCUMENTS

WO WO-2013049826 A1 4/2013

OTHER PUBLICATIONS

Bokhari F.S., et al., "i-POCA: Interference-aware partially overlapping channel assignment in 802.11-based meshes," IEEE International Symposium on a World of Wireless, Mobile and Multimedia Networks (WOWMOM), 2013, pp. 1-6.
(Continued)

*Primary Examiner* — Sai-Ming Chan
(74) *Attorney, Agent, or Firm* — Knobbe Martens Olson & Bear

(57) ABSTRACT

Systems, methods, and devices for wireless communication are described herein. In some aspects, a method includes determining one or more classes of compatible transmissions from one or more wireless devices. The method further includes defining scheduled time slots for each of the one or more classes. The method further includes defining a channel access procedure associated with each of the scheduled time slots. The method further includes accessing a wireless medium during an associated scheduled time slot according to the channel access procedure by one or more of the wireless devices.

47 Claims, 14 Drawing Sheets

(51) Int. Cl.
*H04W 74/08* (2009.01)
*H04W 72/12* (2009.01)

(58) Field of Classification Search
USPC .......................................................... 370/329
See application file for complete search history.

(56) References Cited

U.S. PATENT DOCUMENTS

| | | | |
|---|---|---|---|
| 8,363,581 B2 | 1/2013 | Kim et al. | |
| 2008/0225785 A1* | 9/2008 | Wang ................... | H04W 74/002 370/329 |
| 2010/0208660 A1 | 8/2010 | Ji | |
| 2012/0314694 A1 | 12/2012 | Hsieh | |
| 2013/0083722 A1* | 4/2013 | Bhargava ............ | H04W 72/085 370/315 |
| 2014/0092860 A1 | 4/2014 | Kneckt et al. | |

OTHER PUBLICATIONS

International Search Report and Written Opinion—PCT/US2014/063180—ISA/EPO—Feb. 16, 2015.

\* cited by examiner

SYSTEMS AND METHODS FOR SCHEDULING GROUP ACCESS IN WIRELESS NETWORKS

CROSS-REFERENCE TO RELATED APPLICATIONS

This application claims priority to U.S. Provisional Patent Application No. 61/898,436, entitled "SYSTEMS AND METHODS FOR SCHEDULING GROUP ACCESS IN WIRELESS NETWORKS" and filed Oct. 31, 2013, the entirety of which is incorporated herein by reference.

FIELD

The present application relates generally to wireless communications, and more specifically to systems, methods, and devices for scheduling group access in wireless networks.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, multiple wireless networks may exist in the same building, in nearby buildings, and/or in the same outdoor area. The prevalence of multiple wireless networks may cause interference, reduced throughput (e.g., because each wireless network is operating in the same area and/or spectrum), and/or prevent certain devices from communicating. Thus, improved systems, methods, and devices for communicating when wireless networks are densely populated is desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of the present disclosure provides a method of wireless communication. The method includes determining one or more classes of compatible transmissions from one or more wireless devices. The method further includes defining scheduled time slots for each of the one or more classes. The method further includes defining a channel access procedure associated with each of the scheduled time slots. The method further includes accessing a wireless medium during an associated scheduled time slot according to the channel access procedure by one or more of the wireless devices.

Another aspect provides a device configured for wireless communication. The device comprises a processor configured to determine one or more classes of compatible transmissions from one or more wireless devices. The processor is further configured to define scheduled time slots for each of the one or more classes. The processor is further configured to define a channel access procedure associated with each of the scheduled time slots. The processor is further configured to access a wireless medium during an associated scheduled time slot according to the channel access procedure by one or more of the wireless devices.

Another aspect provides an apparatus for wireless communication. The apparatus includes means for determining one or more classes of compatible transmissions from one or more wireless devices. The apparatus further includes means for defining scheduled time slots for each of the one or more classes. The apparatus further includes means for defining a channel access procedure associated with each of the scheduled time slots. The apparatus further includes means for accessing a wireless medium during an associated scheduled time slot according to the channel access procedure by one or more of the wireless devices.

Another aspect provides a non-transitory computer-readable medium comprising code that, when executed on one or more processors, causes an apparatus to determine one or more classes of compatible transmissions from one or more wireless devices. The medium further includes code that, when executed, causes the apparatus to define scheduled time slots for each of the one or more classes. The medium further includes code that, when executed, causes the apparatus to define a channel access procedure associated with each of the scheduled time slots. The medium further includes code that, when executed, causes the apparatus to access a wireless medium during an associated scheduled time slot according to the channel access procedure by one or more of the wireless devices.

DETAILED DESCRIPTION

Figure 1:
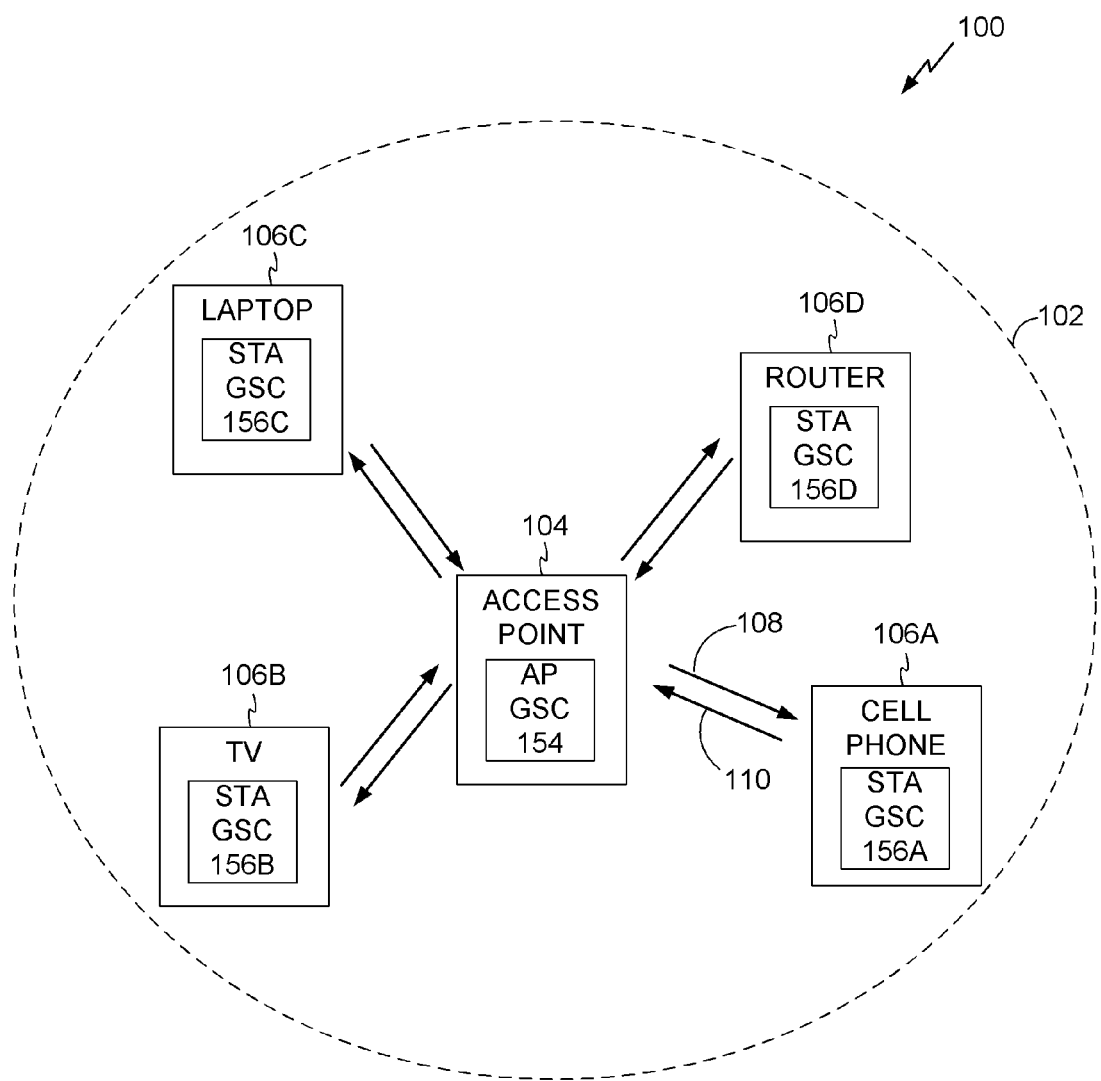
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to the 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for Internet access, sensors, metering, smart grid networks, or other wireless applications. Advantageously, aspects of certain devices implementing the 802.11 protocol using the techniques disclosed herein may include allowing for increased peer-to-peer services (e.g., Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example a high-efficiency 802.11 standard. The wireless communication system 100 may include an AP 104, which communicates with STAs 106A-106D (generically referred to herein as STA(s) 106).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In some aspects, a STA 106 may be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

In an embodiment, the AP 104 includes an AP group scheduling controller (GSC) ("AP GSC") 154. The AP GSC 154 may perform some or all of the operations described herein to enable communications between the AP 104 and the STAs 106 using the 802.11 protocol. The functionality of the AP GSC 154 is described in greater detail below with respect to FIGS. 4-10.

Alternatively or in addition, the STAs 106 may include a STA GSC 156. The STA GSC 156 may perform some or all of the operations described herein to enable communications between the STAs 106 and the AP 104 using the 802.11 protocol. The functionality of the STA GSC 156 is described in greater detail below with respect to FIGS. 4-10.

Figure 2:
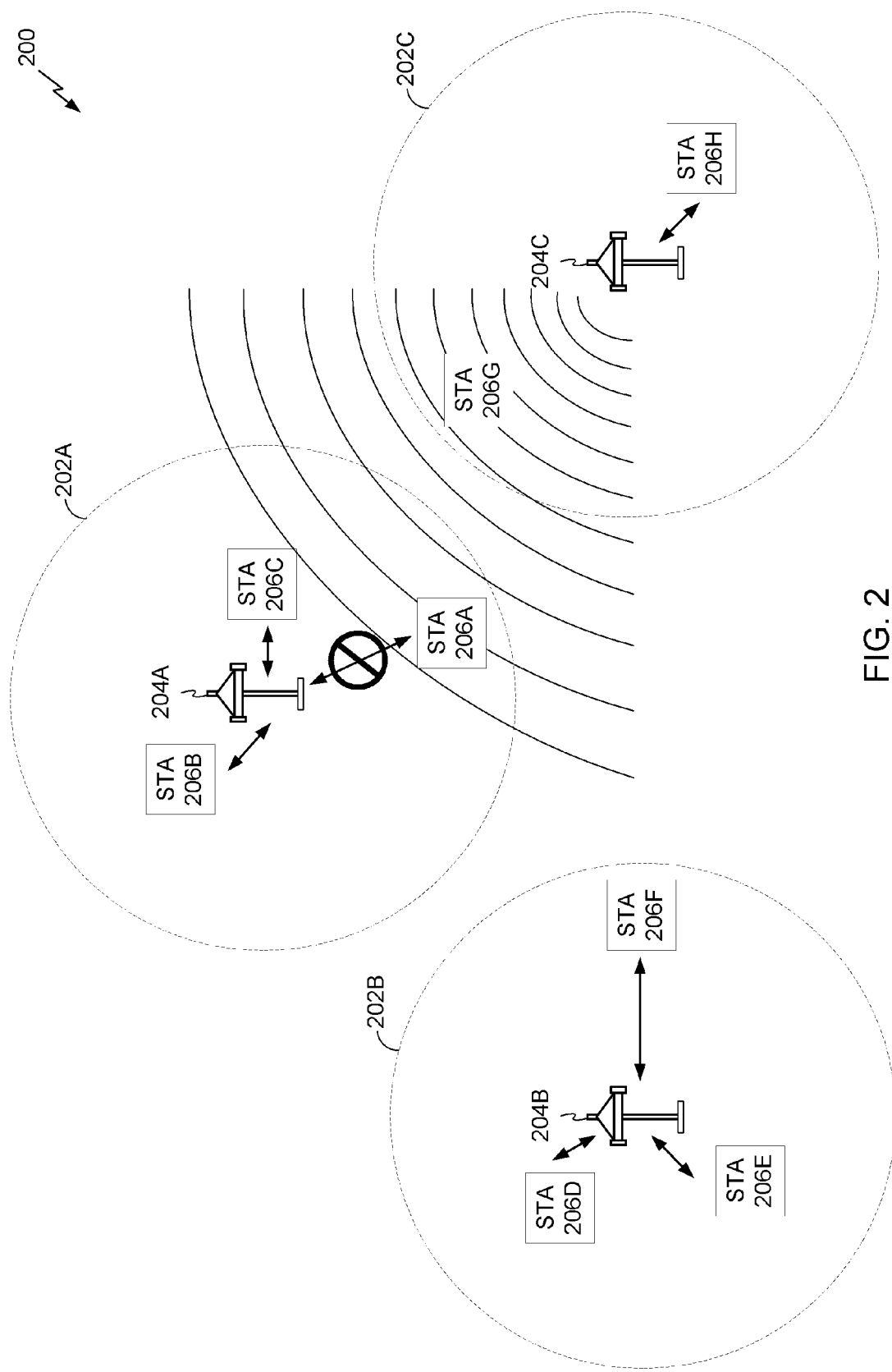
FIG. 2 shows a wireless communication system in which multiple wireless communication networks are present.

In some circumstances, a BSA may be located near other BSAs. For example, FIG. 2 shows a wireless communication system 200 in which multiple wireless communication networks are present. As illustrated in FIG. 2, BSAs 202A, 202B, and 202C may be physically located near each other. Despite the close proximity of the BSAs 202A-C, the APs 204A-C and/or STAs 206A-H may each communicate using the same spectrum. Thus, if a device in the BSA 202C (e.g., the AP 204C) is transmitting data, devices outside the BSA 202C (e.g., APs 204A-B or STAs 206A-F) may sense the communication on the medium.

Generally, wireless networks that use a regular 802.11 protocol (e.g., 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the APs 204A-C and/or STAs 206A-H are operating according to the CSMA mechanism and a device in the BSA 202C (e.g., the AP 204C) is transmitting data, then the APs 204A-B and/or STAs 206A-F outside of the BSA 202C may not transmit over the medium even though they are part of a different BSA.

FIG. 2 illustrates such a situation. As illustrated in FIG. 2, AP 204C is transmitting over the medium. The transmission is sensed by STA 206G, which is in the same BSA 202C as the AP 204C, and by STA 206A, which is in a different BSA than the AP 204C. While the transmission may be addressed to the STA 206G and/or only STAs in the BSA 202C, STA 206A nonetheless may not be able to transmit or receive communications (e.g., to or from the AP 204A) until the AP 204C (and any other device) is no longer transmitting on the medium. Although not shown, the same may apply to STAs 206D-F in the BSA 202B and/or STAs 206B-C in the BSA 202A as well (e.g., if the transmission by the AP 204C is stronger such that the other STAs can sense the transmission on the medium).

The use of the CSMA mechanism then creates inefficiencies because some APs or STAs outside of a BSA may be able to transmit data without interfering with a transmission made by an AP or STA in the BSA. As the number of active wireless devices continues to grow, the inefficiencies may begin to significantly affect network latency and throughput. For example, significant network latency issues may appear in apartment buildings, in which each apartment unit may include an access point and associated stations. In fact, each apartment unit may include multiple access points, as a resident may own a wireless router, a video game console with wireless media center capabilities, a television with wireless media center capabilities, a cell phone that can act like a personal hot-spot, and/or the like. Correcting the inefficiencies of the CSMA mechanism may then be vital to avoid latency and throughput issues and overall user dissatisfaction.

Such latency and throughput issues may not even be confined to residential areas. For example, multiple access points may be located in airports, subway stations, and/or other densely-populated public spaces. Currently, WiFi access may be offered in these public spaces, but for a fee. If the inefficiencies created by the CSMA mechanism are not corrected, then operators of the wireless networks may lose customers as the fees and lower quality of service begin to outweigh any benefits.

Accordingly, the 802.11 protocol described herein may allow for devices to operate under a modified mechanism that minimizes these inefficiencies and increases network throughput. Such a mechanism is described below with respect to FIGS. 4-10. Additional aspects of the 802.11 protocol are described below with respect to FIGS. 5A-23.

Figure 3:
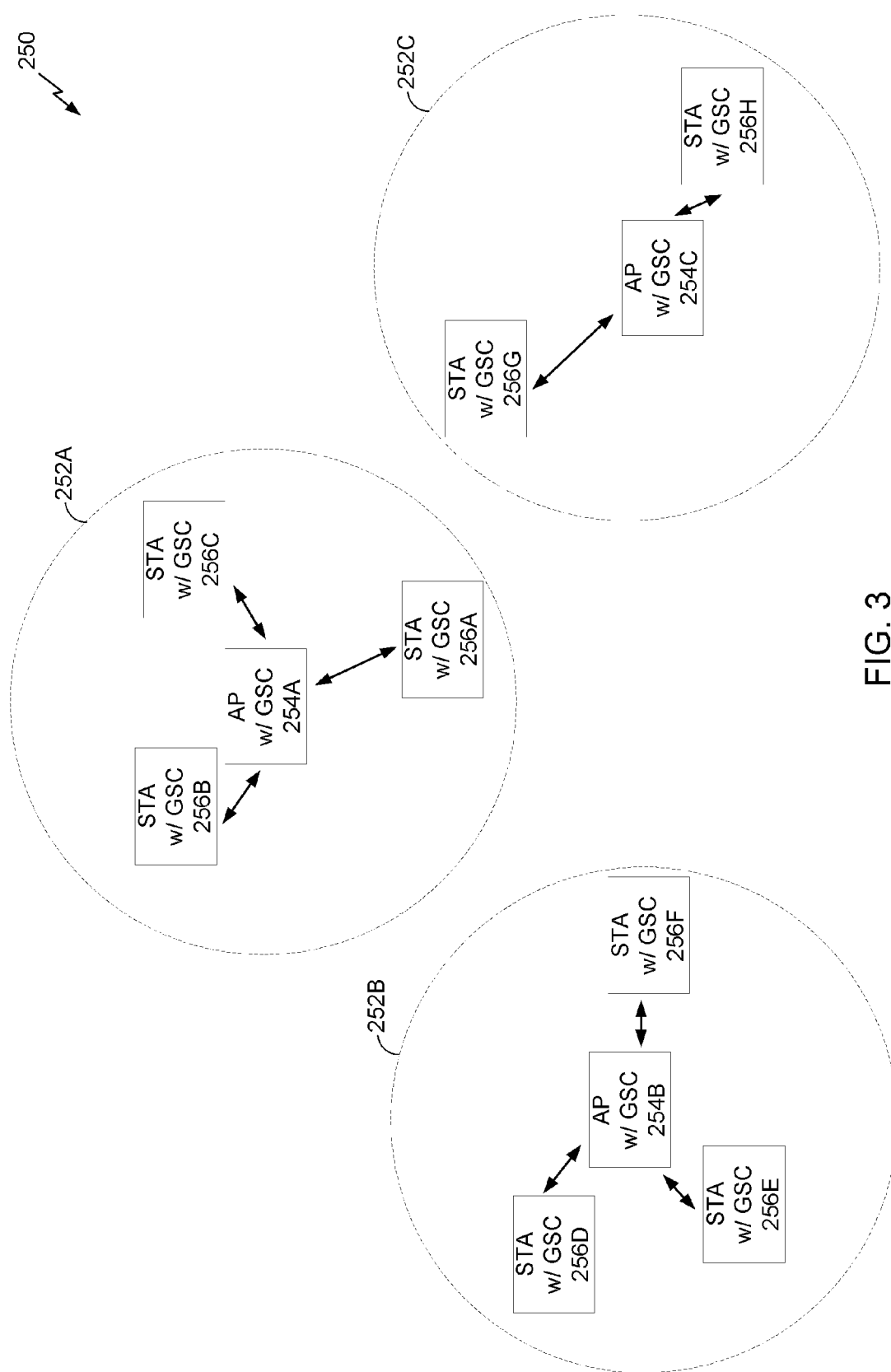
FIG. 3 shows another wireless communication system in which multiple wireless communication networks are present.

FIG. 3 shows a wireless communication system 250 in which multiple wireless communication networks are present. Unlike the wireless communication system 200 of FIG. 2, the wireless communication system 250 may operate pursuant to a high-efficiency 802.11 standard discussed herein. The wireless communication system 250 may include an AP 254A, an AP 254B, and an AP 254C. The AP 254A may communicate with STAs 256A-C, the AP 254B may communicate with STAs 256D-F, and the AP 254C may communicate with STAs 256G-H. In various embodiments, one or more of the APs 254A-254C can belong to a common wireless network.

A variety of processes and methods may be used for transmissions in the wireless communication system 250 between the APs 254A-C and the STAs 256A-H. For example, signals may be sent and received between the APs 254A-C and the STAs 256A-H in accordance with OFDM/OFDMA techniques or CDMA techniques.

The AP 254A may act as a base station and provide wireless communication coverage in a BSA 252A. The AP 254B may act as a base station and provide wireless communication coverage in a BSA 252B. The AP 254C may act as a base station and provide wireless communication coverage in a BSA 252C. It should be noted that each BSA 252A, 252B, and/or 252C may not have a central AP 254A, 254B, or 254C, but rather may allow for peer-to-peer communications between one or more of the STAs 256A-H. Accordingly, the functions of the AP 254A-C described herein may alternatively be performed by one or more of the STAs 256A-H.

In an embodiment, the APs 254A-C and/or STAs 256A-H include a group scheduling controller. As described herein, the group scheduling controller may enable communications between the APs and STAs using the 802.11 protocol. In particular, the group scheduling controller may enable the APs 254A-C and/or STAs 256A-H to use a modified mechanism that minimizes the inefficiencies of the CSMA mechanism (e.g., enables concurrent communications over the medium in situations in which interference would not occur). The group scheduling controller is described in greater detail below with respect to FIGS. 4 and 4A.

As illustrated in FIG. 3, the BSAs 252A-252C are physically located near each other. When, for example, AP 254A and STA 256B are communicating with each other, the communication may be sensed by other devices in BSAs 252B-252C. However, the communication may only interfere with certain devices, such as STA 256F and/or STA 256G. Under CSMA, AP 254B would not be allowed to communicate with STA 256E even though such communication would not interfere with the communication between AP 254A and STA 256B. Thus, the 802.11 protocol operates under a modified mechanism that differentiates between devices that can communicate concurrently and devices that cannot communicate concurrently. In some embodiments TXOPs carrying transmissions with certain characteristics may be defined as belonging to a certain TXOP class. In some embodiments, transmissions from devices that do not (or are unlikely to) interfere can be associated with transmission opportunities (TXOPs) assigned to a same "TXOP class" (e.g., TXOP Class 1, TXOP Class 2, etc.). Classification of transmissions and the corresponding transmitter and receiver devices may be performed by the group scheduling controller in the APs 254A-254C and/or the STAs 256A-256H. TXOP class may also be a function of the entity that owns or administers the transmitters or receiver of the TXOPs. TXOP class may also be a function of the QoS class allowed in of the TXOPs. Several other criteria may be defined to identify a TXOP class. As described further below, in one embodiment, a class may comprise one or more of downlink transmissions from an access point to a client station or uplink transmissions from a client station to an access point. In another embodiment, a class may comprise transmissions that can be correctly received concurrently, as further described below. As further described below, in one embodiment, determining the one or more classes may be on one or more of receiving information from an associated station, the information being related to one or more of a level of wireless device interference or a network topology, a broadcast of class definitions in a beacon, and/or an association response frame.

In an embodiment, the determination of whether a device can (e.g., should be restricted from or allowed to) communicate concurrently with other devices is based on a location of the device. For example, a STA that is located near an edge of the BSA may be in a state or condition such that the STA cannot communicate concurrently with other devices. As illustrated in FIG. 2, STAs 206A, 206F, and 206G may be devices that are in a state or condition in which they cannot communicate concurrently with other devices. Likewise, a STA that is located near the center of the BSA may be in a station or condition such that the STA can communicate with other devices. As illustrated in FIG. 2, STAs 206B, 206C, 206D, 206E, and 206H may be devices that are in a state or condition in which they can communicate concurrently with other devices. So, for example, STAs 206B, 206D, and 206H could all be associated with TXOPs assigned to TXOP Class 1. Similarly, STAs 206C and 206E could be associated with TXOPs assigned to TXOP Class 2. Note that the classification of devices is not permanent. Devices may transition between being in a state or condition such that they can communicate concurrently and being in a state or condition such that they cannot communicate concurrently (e.g., devices may change states or conditions when in motion, when associating with a new AP, when disassociating, etc.). Moreover, different TXOP classes can be assigned an ordered priority. For example, TXOP Class 1 may be given a higher transmission priority than TXOP Class 2.

Furthermore, devices may be configured to behave differently based on whether they are ones that are or are not in a state or condition to communicate concurrently with other devices. For example, devices that are in a state or condition such that they can communicate concurrently may communicate within the same spectrum. However, devices that are in a state or condition such that they cannot communicate concurrently may employ certain techniques, such as spatial multiplexing or frequency domain multiplexing, in order to communicate over the medium. In various embodiments, devices can schedule transmission based on their associated TXOP class. The controlling of the behavior of the devices may be performed by the group scheduling controller in the APs 254A-254C and/or the STAs 256A-256H, as further described in connection with FIG. 4A.

Figure 4:
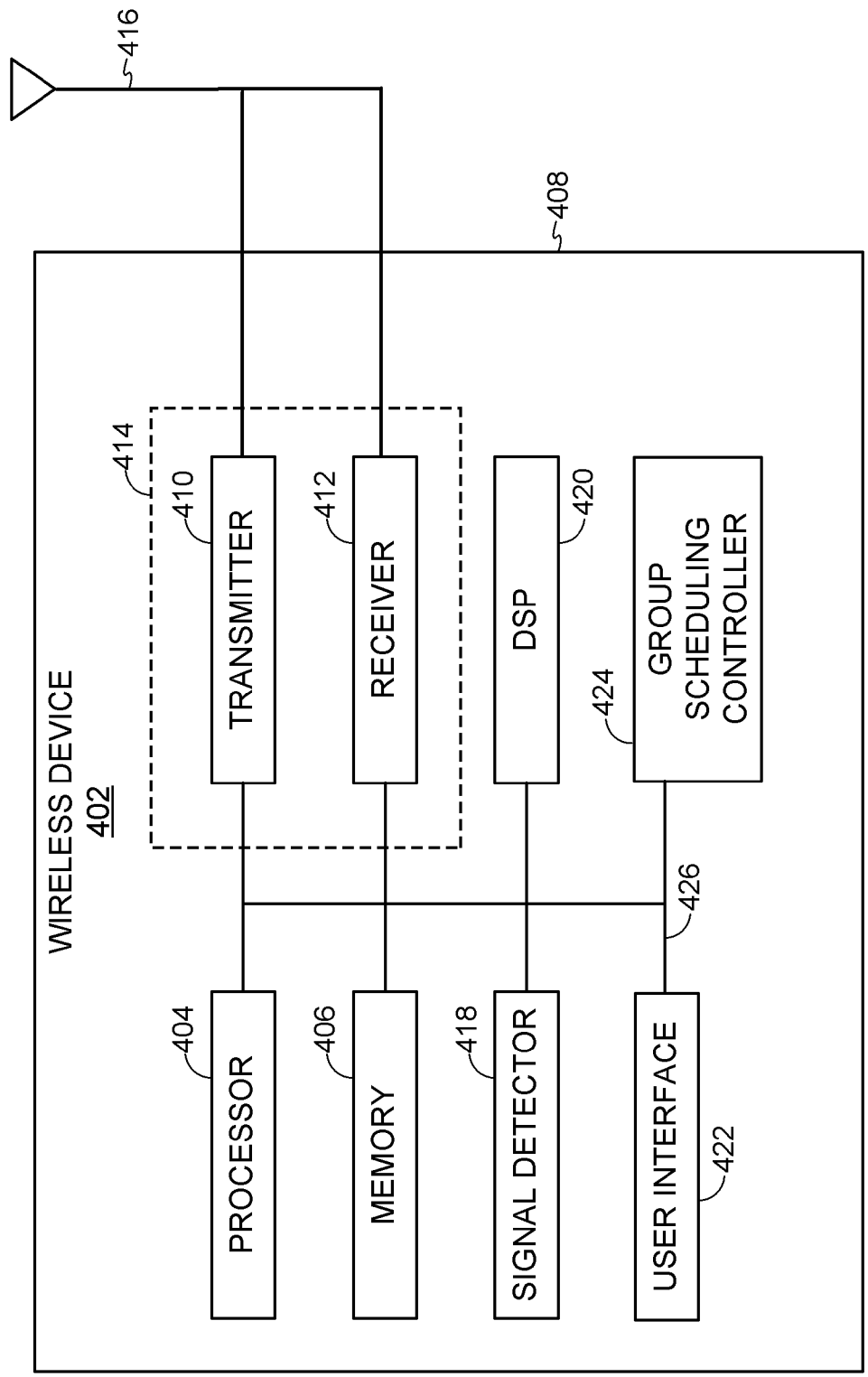
FIG. 4 shows a functional block diagram of an exemplary wireless device that may be employed within the wireless communication systems of FIGS. 1-3.

FIG. 4 shows an exemplary functional block diagram of a wireless device 402 that may be employed within the wireless communication systems 100, 200, and/or 250 of FIGS. 1-3. The wireless device 402 is an example of a device that may be configured to implement the various methods described herein. For example, the wireless device 402 may comprise the AP 104, one of the STAs 106, one of the APs 254, and/or one of the STAs 256.

The wireless device 402 may include a processor 404 which controls operation of the wireless device 402. The processor 404 may also be referred to as a central processing unit (CPU). A memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408 that may include a transmitter 410 and/or a receiver 412 to allow transmission and reception of data between the wireless device 402 and a remote location. The transmitter 410 and receiver 412 may be combined into a transceiver 414. An antenna 416 may be attached to the housing 408 and electrically coupled to the transceiver 414. The wireless device 402 may also include (not shown) multiple transmitters, multiple receivers, multiple transceivers, and/or multiple antennas.

The wireless device 402 may also include a signal detector 418 that may be used in an effort to detect and quantify the level of signals received by the transceiver 414. The signal detector 418 may detect such signals as total energy, energy per subcarrier per symbol, power spectral density and other signals. The wireless device 402 may also include a digital signal processor (DSP) 420 for use in processing signals. The DSP 420 may be configured to generate a packet for transmission. In some aspects, the packet may comprise a physical layer data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user. The wireless devices 402 may further comprise a group scheduling controller 424 (also referred to herein as "GSC") in some aspects, as further described with respect to FIG. 4A.

The various components of the wireless device 402 may be coupled together by a bus system 426. The bus system 426 may include a data bus, for example, as well as a power bus, a control signal bus, and a status signal bus in addition to the data bus. Those of skill in the art will appreciate the components of the wireless device 402 may be coupled together or accept or provide inputs to each other using some other mechanism.

Although a number of separate components are illustrated in FIG. 4, those of skill in the art will recognize that one or more of the components may be combined or commonly implemented. For example, the processor 404 may be used to implement not only the functionality described above with respect to the processor 404, but also to implement the functionality described above with respect to the signal detector 418 and/or the DSP 420. Further, each of the components illustrated in FIG. 4 may be implemented using a plurality of separate elements.

The wireless device 402 may comprise an AP 104, a STA 106, an AP 254, and/or a STA 256, and may be used to transmit and/or receive communications. That is, any of AP 104, STA 106, AP 254, and/or STA 256 may serve as transmitter or receiver devices. Certain aspects contemplate signal detector 418 being used by software running on memory 406 and processor 404 to detect the presence of a transmitter or receiver.

As described above, network throughput and latency may be a major concern in wireless networks when the CSMA mechanism is used. For example, wireless devices associated with one wireless network may be located in close proximity to other wireless devices associated with other wireless networks. Wireless devices of one network may sense a transmission by another wireless device of another network, and thus refrain from transmitting over the medium, even when no interference would occur. Accordingly, a modified mechanism can be used in the 802.11 protocol to alleviate some of these issues.

In the modified mechanism, wireless devices may be classified according to a state or condition of the wireless device. For example, a wireless device may be in a state or condition in which the wireless device can communicate concurrently with other wireless devices (e.g., because the wireless device is located away from an edge of the BSA and thereby would not cause interference). Sets of wireless devices that can reuse the wireless medium can be assigned to "compatible" TXOP classes. In certain embodiments, for example, a compatible TXOP class could include all TXOPs where only a certain set of STAs can transmit/receive (for example, based on a sector associated with each STA or STA support for a certain modulation control scheme). In various embodiments described herein, communications can be scheduled (e.g., in time slots based on class) such that compatible TXOPs gain access to the wireless medium at the same time, thereby improving medium reuse.

Figure 4A:
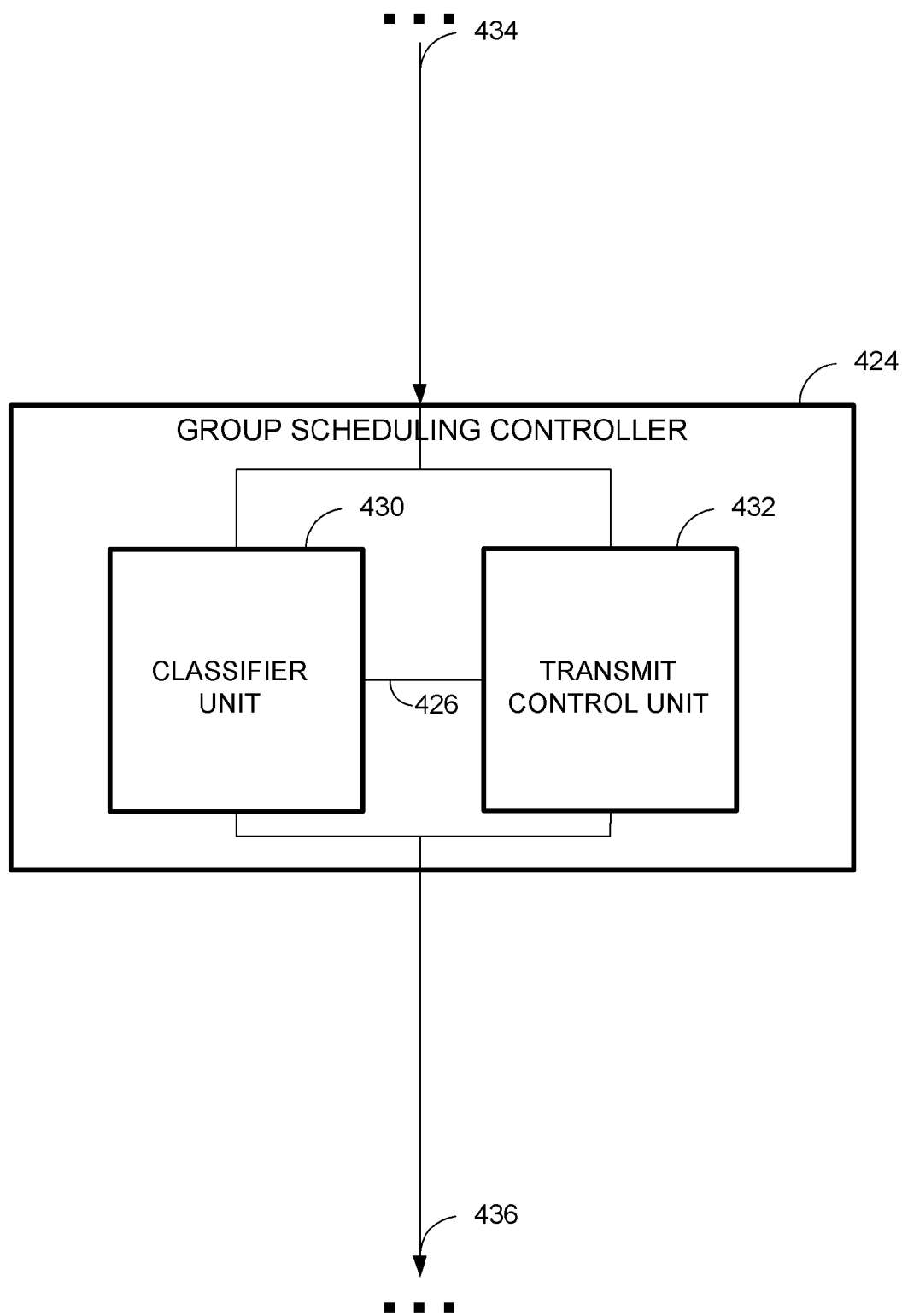
FIG. 4A shows an exemplary functional block diagram of a group scheduling controller that may be employed within the wireless communication systems of FIGS. 1-3.

FIG. 4A shows an exemplary functional block diagram of a group scheduling controller (e.g., either of the STA or AP group scheduling controller 424 of FIG. 4, also referred to herein as "GSC") that may be employed within the wireless communication systems 100, 200, and/or 250 of FIGS. 1-3. As described in connection with FIG. 4, in one embodiment, the group scheduling controller 424 may be operationally connected to the wireless device 402 and/or one or more of the components of the wireless device 402. In one embodiment, the group scheduling controller 424 may perform some or all of the operations described herein to enable communications between the AP 104 and the STAs 106 of FIG. 1 using the 802.11 protocol. In one embodiment, certain aspects performed by the group scheduling controller and/or its components may be described as channel access procedures.

In some embodiments, the group scheduling controller 424 may include a classifier unit 430 and a transmit control unit 432. As described herein, the group scheduling controller 424 may enable APs and/or STAs to use a modified mechanism that minimizes the inefficiencies of the CSMA mechanism (e.g., schedules concurrent communications over the medium in situations in which interference would not occur). The modified mechanism may be implemented by the classifier unit 430 and the transmit control unit 432. The group scheduling controller 424 may process various data inputs 434 from various input devices (not pictured) and provide various data outputs 436 to various output devices (not pictured) to enable the APs and/or the STAs to use the modified mechanism. For example, the data inputs 434 may include location information of various devices (e.g., the APs and/or the STAs) and the data outputs 436 may include classifications of the various devices as determined based on the location information, as further described below. The various input devices and output devices may include the wireless device 402, the processor 404, the memory 406, the transceiver 414, and/or any of the other components as illustrated in FIG. 4. In one embodiment, the various input devices and output devices may include devices other than those illustrated in FIG. 4.

The various components of the group scheduling controller 424 may be coupled together by a bus system 426. The bus system 426 may include a data bus, for example, as well as a power bus, a control signal bus, and a status signal bus in addition to the data bus. Those of skill in the art will appreciate that the components of the group scheduling controller 424 may be coupled together or accept or provide inputs to each other using some other mechanism. In one embodiment, the group scheduling controller may receive the data inputs 434 and send the data outputs 436 via the bus system 426.

In an embodiment, the classifier unit 430 determines which devices (e.g., the APs and/or the STAs) are in a state or condition such that they can communicate concurrently with other devices and which devices are in a state or condition such that they cannot communicate concurrently with other devices. The classifier unit 430 may make such determinations based on location information about the APs and/or the STAs, which the group scheduling controller 424 may receive (as the data inputs 434) via the bus system 426. In one embodiment, such a determination may allow the group scheduling controller 424 (or some other device) to associate (or "classify") transmissions from such devices with certain transmission opportunities (TXOPs) assigned to a certain TXOP class, as further described in connection with FIG. 3. In one aspect, the group scheduling controller 424 may also classify the transmitters and/or receivers associated with the transmissions to a certain TXOP class. The classifier unit 430 may provide such classifications to the transmit control unit 432, the group scheduling controller 424, and/or any other device.

In an embodiment, the transmit control unit 432 may control the behavior of devices (e.g., the APs and/or the STAs). For example, the transmit control unit 432 may allow certain devices to transmit concurrently on the same medium and allow other devices to transmit using a spatial multiplexing or frequency domain multiplexing technique. In one embodiment, the transmit control unit 432 may base such behavior control on information the transmit control unit 432 receives from the classifier unit 430 (e.g., the classifications described above) or from any other device.

Figure 5:
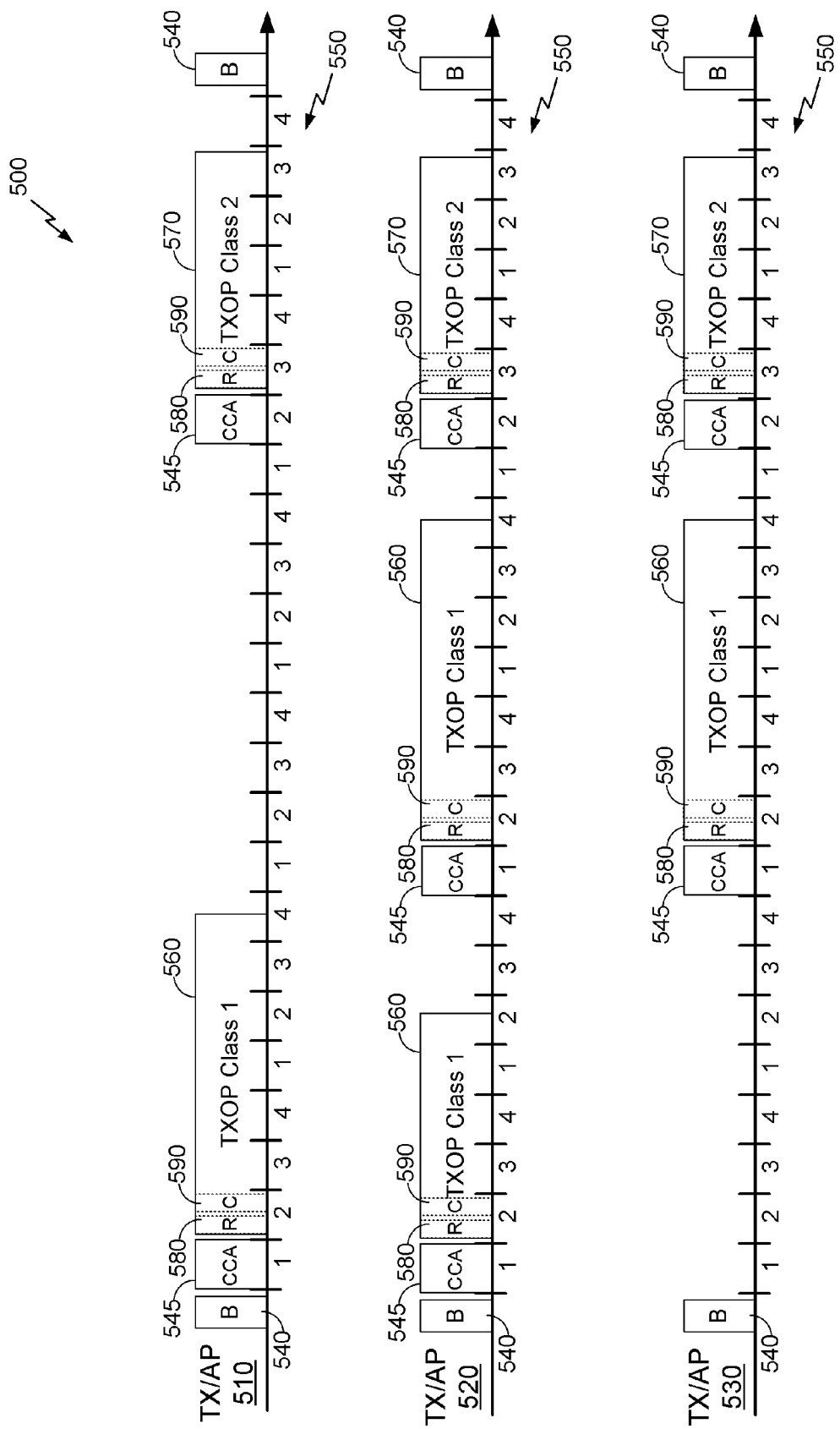
FIG. 5 shows a timing diagram in which aspects of the present disclosure may be employed.

FIG. 5 shows a timing diagram 500 in which aspects of the present disclosure may be employed. In particular, FIG. 5 shows a timing diagram 500 that may be used in accordance with a slotted indexed mechanism for scheduling group access to the wireless medium. As illustrated in FIG. 5, three transmitters are present: transmitter 510, transmitter 520, and transmitter 530. Although three transmitters are shown, additional or fewer transmitters can be used. In various embodiments, each transmitter 510, 520, and/or 530 can use the same or overlapping channels (e.g., on a wireless medium).

In some embodiments, each transmitter 510, 520, and/or 530 can be associated with a separate AP such as, for example, the APs 254A-254C discussed above with respect to FIG. 3. In some embodiments, each transmitter 510, 520, and/or 530 can be associated with single AP such as, for example, different transmitters and/or sectors of the AP 104 (FIG. 1). In various embodiments the transmitters 510, 520, and/or 530 can be associated with the same wireless network. In some embodiments, one or more transmitters 510, 520, and/or 530 can be associated with a separate wireless network.

As shown in FIG. 5, one or more APs transmit beacons 540 on each transmitter 510, 520, and/or 530. For example, the AP 254A can transmit a beacon 540 on the transmitter 510, the AP 254B can transmit a beacon 540 on the transmitter 520, and the AP 254C can transmit a beacon 540 on the transmitter 530. In some embodiments, the beacons 540 can define a plurality of indexed time slots 550. In other embodiments, the indexed time slots 550 can be defined in other ways such as, for example, stored as a predetermined value in a memory. In various embodiments, the transmitters 510, 520, and/or 530 can at least partially synchronize the time slots 550, for example using the beacons 540, backhaul communications, and/or other wireless messages.

In the illustrated embodiment, each time slot 550 is associated with a TXOP class. For example, TXOP Class 1 can be associated with index number 1, TXOP class 2 can be associated with index number 2, etc. Although four index numbers are shown (1-4), a person having ordinary skill in the art will appreciate that greater or fewer index numbers can be used. Moreover, while the time slots 550 are indexed in an equally-weighted, incrementing, and periodic pattern manner, other index sequences are possible such as, for example, decrementing, weighted (for example, with lower index numbers occurring more frequently than higher index numbers), and/or non-periodic (for example, non-repeating).

In various embodiments, a plurality of APs (such as, for example, transmitters 510, 520, and 530) can coordinate to assign TXOP classes with time slots 550. In some embodiments, the transmitters 510, 520, and 530 can advertise the TXOP class/time slot 550 associations in the beacons 540. In some embodiments, the transmitters 510, 520, and 530 can independently associate TXOP classes with time slots 550, for example dynamically based on observed behavior of other transmitters. A person having ordinary skill in the art will appreciate that the description herein related to TXOP class/slot associations can apply to any other embodiments described herein.

In various embodiments, a plurality of APs (such as, for example, transmitters 510, 520, and 530) can coordinate to use the same time slot 550 size. In some embodiments, the transmitters 510, 520, and 530 can advertise the time slot 550 size in the beacons 540. In some embodiments, the transmitters 510, 520, and 530 can use a standard slot size, or select from a plurality of standard slot sizes, which can be for example retrieved from a memory or hard-coded.

In various embodiments, a device (e.g., any of the devices described in connection with FIGS. 1-4) may define and/or perform a channel access procedure during one or more of the time slots 550. In one embodiment, the channel access procedure may result in messages being (or not being) transmitted and/or received concurrently, as described above. In one embodiment, one or more devices may access a wireless medium and/or perform various operations (e.g., the CCA, RTS, CTS, and/or backoff, etc. operations described above and below) during an associated time slot 550 based on a result of the channel access procedure(s).

In some embodiments, each time slot can be long enough to allow the transmitters 510, 520, and 530 to perform a CCA procedure on the channel, thereby enhancing legacy coexistence and/or regulatory compliance and enabling coordinated medium access across the multiple transmitters. In one example, the time slot 550 may be a point coordination function interframe space (PIFS) long (e.g., 25 μs). In another example, the time slot 550 may be an arbitration interframe space (AIFS). In another example, the time slot 550 may be of a length shorter than PIFS, thus enabling the transmitters 510, 520, and 530 to have priority on medium access that is higher than any device compliant with the 802.11 standard. A person having ordinary skill in the art will appreciate that the description herein related to the time slots 550 can apply to any other embodiments described herein such as, for example, the slots 650 of FIG. 6.

As shown in FIG. 5, when transmitters 510, 520, and/or 530 have data for a particular TXOP class, they begin a transmission procedure starting with a time slot 550 having an associated index. Thus, for example, when the transmitters 510, 520, and/or 530 have data for TXOP Class 1, they can perform a clear channel assessment (CCA) 545 in the time slot 550 index 1. In one embodiment, the CCA may allow for selectively scheduling or refraining from scheduling at least one message for transmission based on a result of the CCA. For example, if the CCA determines that the channel is idle, the transmitters 510, 520, and/or 530 can begin transmission. In the illustrated embodiment, the length of the time slots 550 is equal to the CCA 545 time. Thus, when the CCA determines that the channel is idle, the transmitters 510, 520, and/or 530 begin transmission in the following time slot 550. In some embodiments, the time slot 550 can be shorter or greater than the CCA 545 time, in which case the transmitters 510, 520, and/or 530 upon completion of the CCA 545 (for example, immediately, after a delay, or at a predefined boundary time).

If the CCA determines that the channel is not idle, the transmitters 510, 520, and/or 530 can refrain from transmitting, and in some embodiments can recheck the channel during the next time slot 550 period. In one aspect, the CCA 545 state at a slot for a particular TXOP class can be used by the transmitters 510, 520, and/or 530 to decrement a backoff counter associated with the TXOP class. The backoff for a class can decrement only if the CCA 545 indicates that the medium is idle during the time slots 550 allocated to that particular TXOP class. When the backoff countdown expires at a time slot 550, the transmitter can then begin a transmission for the particular TXOP class. In the illustrated embodiment, for example, the APs 254A-254C have data for TXOP Class 1 at various points in the timing diagram 500. Thus, they perform a CCA in the time slot 550 index 1, during which time the channel is idle. Accordingly, starting at time slot 550 index 2, the APs 254A-254C begin transmitting TXOP Class 1 transmissions 560. In one embodiment, the performance of the CCA procedure may start at a beginning of the associated time slot 550. In such embodiment, a backoff procedure according to a backoff value associated with the time slot may be performed. In one aspect, the backoff value may be initialized to a first value at the beginning of the associated time slot, and the backoff value may be decremented while an associated channel is assessed to be idle, as further described below.

Likewise, the APs 254A-254C have data for TXOP Class 2 at a later point in the timing diagram 500. Thus, they perform a CCA in the time slot 550 index 2, during which time the channel is idle. Accordingly, starting at time slot 550 index 3, the APs 254A-254C begin transmitting TXOP Class 2 transmissions 570.

In the illustrated embodiment, TXOP Class 1 transmissions 560 begin at time slots 550 indexed 2 and TXOP Class 2 transmissions 570 begin at time slots 550 indexed 3. In other embodiments, TXOP Class 1 transmissions 560 can begin in earlier or later time slot 550 indexes such as, for example, indexes 1 or 3.

In various embodiments, a plurality of APs (such as, for example, transmitters 510, 520, and 530) can coordinate to define a maximum transmission time. The maximum transmission time can limit the length of the TXOP Class 1 transmissions 560 and TXOP Class 2 transmissions 570, for example on a per-TXOP basis. In some embodiments, the transmitters 510, 520, and 530 can advertise the maximum transmission time in the beacons 540. In some embodiments, the transmitters 510, 520, and 530 can use a maximum transmission time, or select from a plurality of standard maximum transmission time, which can be for example retrieved from a memory or hard-coded. A person having ordinary skill in the art will appreciate that the description herein related to the maximum transmission time can apply to any other embodiments described herein such as, for example, the transmissions 660, 670, and 675 of FIG. 6, the transmissions 870 of FIG. 8, the transmissions 970 of FIG. 9, and the transmissions 1070 and 1075 of FIG. 10.

In the embodiments described above, it may be possible for certain transmissions to interfere. For example, a TXOP Class 1 transmission 560 could extend beyond several ms (or a single time slot 550 index period), during which time a hidden AP could start a TXOP Class 2 transmission during the same time, thereby causing interference. In other words, the hidden AP might not be aware of the TXOP Class 1 transmission already started.

In some embodiments, the each time slot 550 can be long enough to host a short ready-to-send (RTS) message (short RTS frame) 580 and clear-to-send (CTS) message (short CTS frame) 590. The transmitters 510, 520, and/or 530 can be configured to start transmissions by sending the short RTS frame 580, which in some embodiments is identical across multiple transmitters or APs. One or more STAs that are the intended recipient of the TXOP class can send the short CTS frame 590 in response. In some embodiments, the short CTS frame 590 can be fixed based on TXOP class, and can therefore be identical across all responding devices. The transmitters 510, 520, and/or 530 can grant the TXOP only if at least one short CTS frame 590 is received. Likewise, if another (e.g., hidden) AP receives the short RTS frame 580 or the short CTS frame 590, it will be notified that the next TXOP is reserved for a specific class of TXOP. Thus, the hidden AP can refrain from starting a TXOP of a different class.

In some embodiments, each time slot 550 can be long enough to host an entire packet transmission, e.g., according to the maximum transmission time. In various embodiments, each time slot 550 can be 1 ms long, 2 ms long, etc. In various embodiments, the transmitters 510, 520, and/or 530 can be configured to start transmissions only at a time slot 550 start time. The transmitters 510, 520, and/or 530 can be configured to use an initial portion of a time slot 550 for the CCA check as discussed above. In an embodiment, the transmitters 510, 520, and/or 530 can be configured to perform the CCA check just prior to a time slot 550 start time.

In various embodiments, the transmitters 510, 520, and/or 530 can be configured to complete transmission within a single time slot 550. In some embodiments, the transmitters 510, 520, and/or 530 can be configured for transmission spanning multiple time slots 550. In various embodiments, the transmitters 510, 520, and/or 530 can be configured to complete transmission within a threshold amount of time prior to the end of a time slot 550, for example to provide time for a CCA check for the next slot as described above.

In various embodiments, the transmitters 510, 520, and/or 530 can be configured to perform a backoff procedure prior to transmitting on a given time slot 550. In various embodiments, the transmitters 510, 520, and/or 530 can be configured to perform the backoff procedure during any time prior to transmission. In some embodiments, a slot (now shown) size used for backoff countdown can be different from the time slot 550 size defined for media access. For example, a backoff procedure similar or compliant with the one defined in IEEE 802.11 standard can be used. In various embodiments, the transmitters 510, 520, and/or 530 can be configured to wait for the slot start time to initiate the transmission when the backoff counter expires before the slot start time. In such case, the transmitters 510, 520, and/or 530 can be configured to perform CCA at the start of the next slot or right before the next slot.

Figure 6:
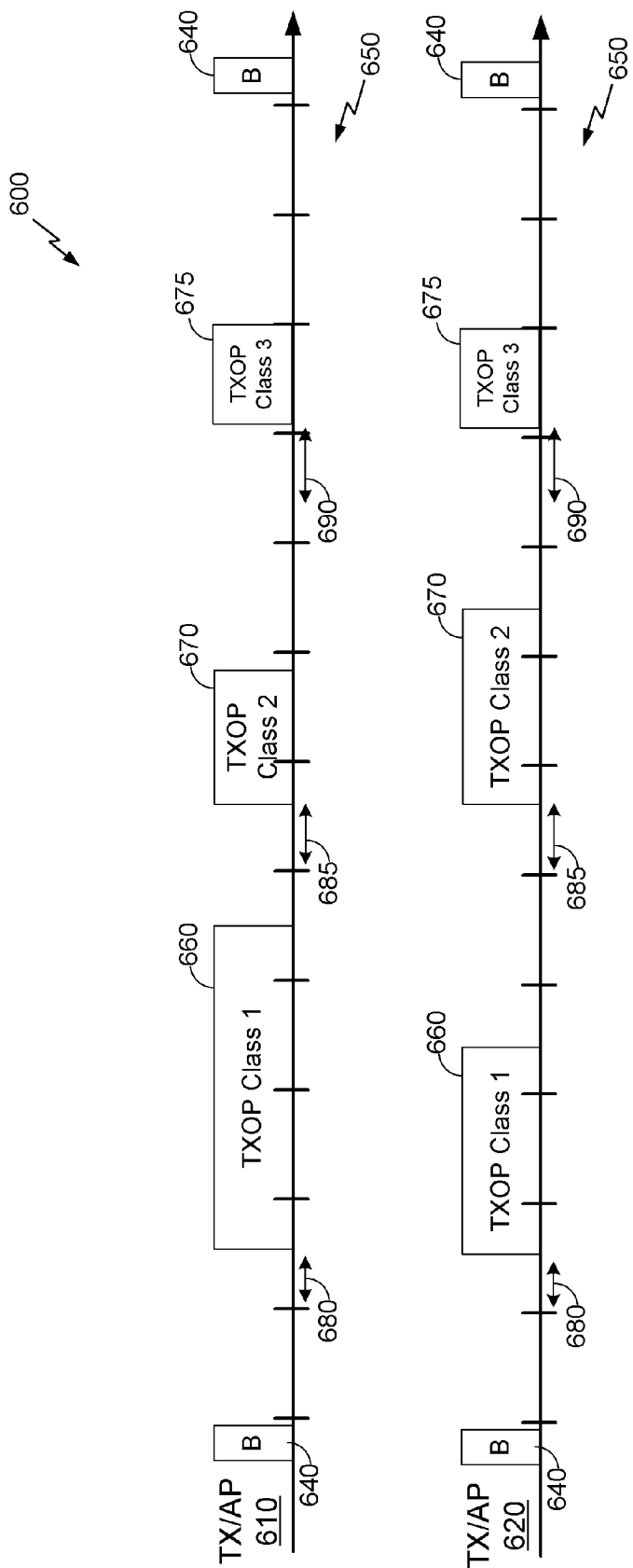
FIG. 6 shows another timing diagram in which aspects of the present disclosure may be employed.

FIG. 6 shows another timing diagram 600 in which aspects of the present disclosure may be employed. In particular, FIG. 6 shows a timing diagram 600 that may be used in accordance with a slotted mechanism with backoff for scheduling group access to the wireless medium. As illustrated in FIG. 6, two transmitters are present: transmitter 610 and transmitter 620. Although three transmitters are shown, additional or fewer transmitters can be used. In various embodiments, each transmitter 610 and/or 620 can use the same or overlapping channels.

In some embodiments, each transmitter 610 and/or 620 can be associated with a separate AP such as, for example, the APs 254A-254B discussed above with respect to FIG. 3. In some embodiments, each transmitter 610 and/or 620 can be associated with single AP such as, for example, different transmitters and/or sectors of the AP 104 (FIG. 1). In various embodiments the transmitters 610 and/or 620 can be associated with the same wireless network. In some embodiments, one or more transmitters 610 and/or 620 can be associated with a separate wireless network.

As shown in FIG. 6, one or more APs transmit beacons 640 on each transmitter 610 and/or 620. For example, the AP 254A can transmit a beacon 640 on the transmitter 610 and the AP 254B can transmit a beacon 640 on the transmitter 620. In some embodiments, the beacons 640 can define a plurality of time slots 650. In other embodiments, the time slots 650 can be defined in other ways such as, for example, stored as a predetermined value in a memory. In various embodiments, the transmitters 610 and/or 620 can at least partially synchronize the time slots 650, for example using the beacons 640, backhaul communications, and/or other wireless messages.

In contrast to the time slots 550 described above with respect to FIG. 5, each time slot 650 is not necessarily associated with a TXOP class. Instead, the transmitters 610 and/or 620 can contend to transmit any TXOP Class transmission 660, 670, and/or 675 during any time slot 650, according to a backoff period 680, 685, and/or 690 associated with each TXOP Class.

In some embodiments, each time slot 650 can be long enough to host an entire packet transmission, e.g., according to the maximum transmission time. In various embodiments, each time slot 650 can be 1 ms long, 2 ms long, etc. In various embodiments, the transmitters 610 and/or 620 can be configured to start transmissions only at a time slot 650 start time. The transmitters 610 and/or 620 can be configured to use an initial portion of a time slot 650 for the CCA check as discussed above. In an embodiment, the transmitters 610 and/or 620 can be configured to perform the CCA check just prior to a time slot 650 start time.

In various embodiments, the transmitters 610 and/or 620 can be configured to perform a backoff procedure prior to transmitting on a given time slot 650. In various embodiments, the transmitters 610 and/or 620 can be configured to perform the backoff procedure during any time prior to transmission. In one example, a backoff procedure similar or compliant with the one defined in IEEE 802.11 standard can be used. In some embodiments, a size of a given time slot 650 to be used for a backoff countdown can be different from a size of a given time slot 650 as defined to be used for media access. In various embodiments, the transmitters 610 and/or 620 can be configured to wait for the slot start time to initiate the transmission when the backoff counter expires before the slot start time. In such case, the transmitters 610 and/or 620 can be configured to perform CCA at the start of the next slot or right before the next slot.

In various embodiments, the transmissions belonging to a certain class may be limited to be completed within the time slot assigned to the certain class. As illustrated in FIG. 6, at the transmission of the TXOP Class transmissions 675 (e.g., for class number 3), the transmitters 610 and/or 620 can be configured to complete each of their respective transmissions within a single time slot 650. For example, as illustrated in FIG. 6 and as further described below, the TXOP Class transmission 675 associated with the transmitters 610 and 620 end at the end of one of the time slots 650 (e.g., the TXOP Class transmissions 675 do not cross the boundary of the next time slot 650). In some embodiments, the transmitters 610 and/or 620 can be configured for transmission spanning multiple time slots 650. For example, in various embodiments, the transmitters 610 and/or 620 can be configured to complete transmission within a threshold amount of time prior to the end of a time slot 650, for example, to provide time for a CCA check for the next slot as described above.

As shown in FIG. 6, when transmitters 610 and/or 620 have data for a particular TXOP class, they begin a transmission procedure starting with the next time slot 650. Thus, for example, when the transmitters 610 and/or 620 have data for TXOP Class 1, they can wait a TXOP Class 1 backoff period 680 associated with TXOP Class 1. In various embodiments, the backoff periods associated with each TXOP class can be different for each TXOP class, ranked or prioritized, deterministic, dependent on the class, a function of the class, a residual value of a backoff period at a previous time slot assigned to the same class, and/or can be different for different slots 650. In one embodiment, the backoff period associated with each TXOP class can be random. For example, the TXOP Class 1 backoff period 680 for TXOP Class 1 can be shorter than the TXOP Class 2 backoff period 685 for TXOP Class 2, which can be shorter than the TXOP Class 3 backoff period 690 for TXOP Class 3, and so on. In various embodiments, the backoff periods can start at the beginning of each slot.

In the illustrated embodiment, for example, the APs 254A-254B (e.g., transmitters 610 and 620) have data for TXOP Classes 1, 2, and 3 at first. Thus, they perform contention procedure including the TXOP Class 1 backoff period 680 associated with the TXOP Class 1. Because the TXOP Class 1 backoff period 680 is the shortest backoff period, the TXOP Class 1 transmissions 660 will win the contention. Thus, the transmitters 610 and 620 can begin transmitting the TXOP Class 1 transmissions 660 at the same time, thereby allowing reuse of the wireless medium.

Likewise, the APs 254A-254B (e.g., transmitters 610 and 620) have data for TXOP Classes 2 and 3 (but no longer for Class 1) at a later point in the timing diagram 600. Thus, they perform contention procedure including the backoff period 685 associated with the TXOP Class 2. Because the TXOP Class 2 backoff period 685 is shorter than the TXOP Class 3 backoff period 690, the TXOP Class 2 transmissions 670 will win the contention, and so on.

In various embodiments, the duration of the backoff period can be different on a per-class basis by changing one or more of the AIFS Duration, the CWmin and the CWmax numbers. In some embodiments, the backoff procedure can be reset at each time slot. In other embodiments, residual backoffs can be carried over to the next available slot.

Figure 7:
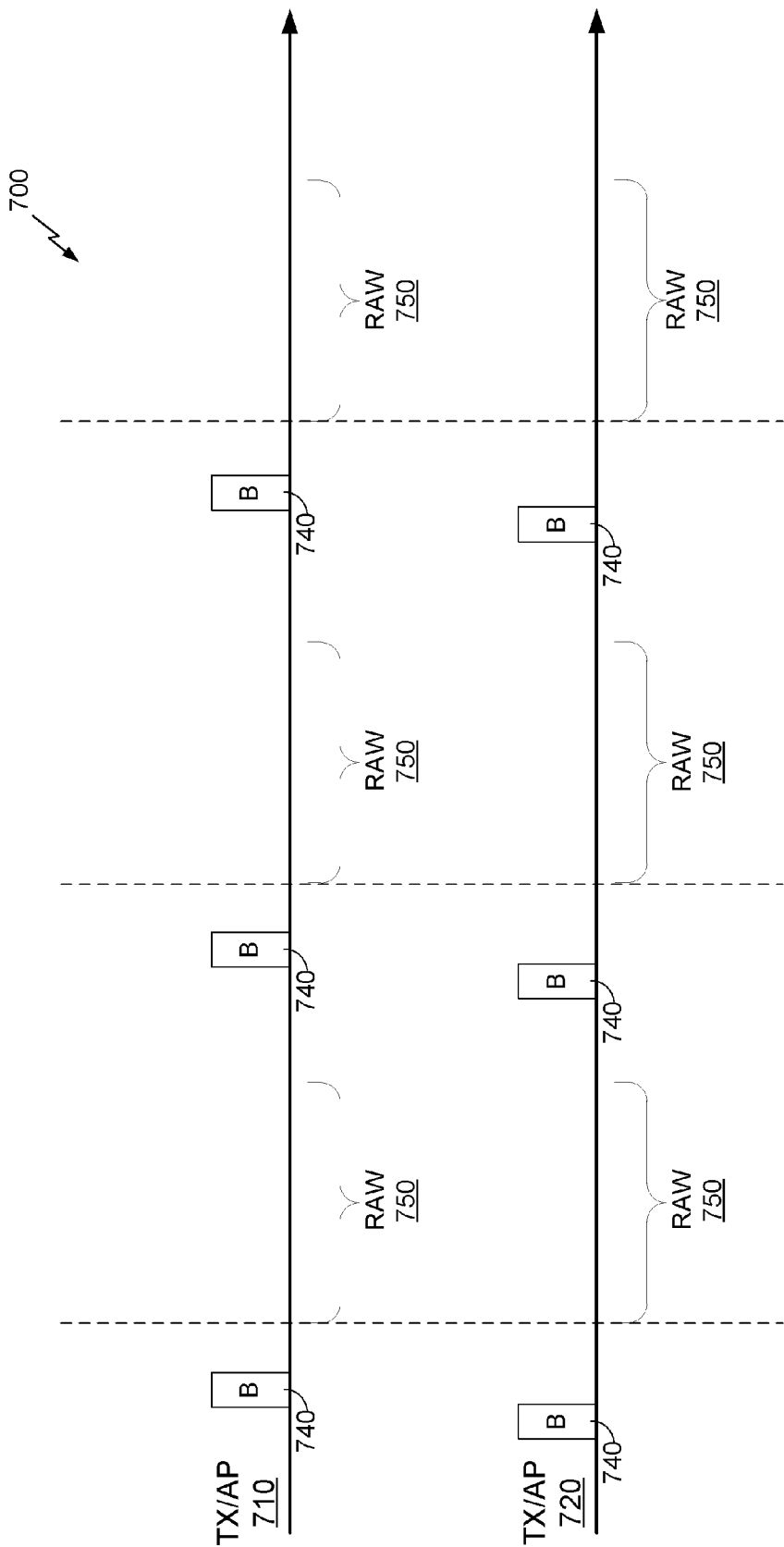
FIG. 7 shows another timing diagram in which aspects of the present disclosure may be employed.

FIG. 7 shows another timing diagram 700 in which aspects of the present disclosure may be employed. In particular, FIG. 7 shows a timing diagram 700 that may be used in accordance with a reserved access window (RAW) for scheduling group access to the wireless medium. As illustrated in FIG. 7, two transmitters are present: transmitter 710 and transmitter 720. Although three transmitters are shown, additional or fewer transmitters can be used. In various embodiments, each transmitter 710 and/or 720 can use the same or overlapping channels.

In some embodiments, each transmitter 710 and/or 720 can be associated with a separate AP such as, for example, the APs 254A-254B discussed above with respect to FIG. 3. In some embodiments, each transmitter 710 and/or 720 can be associated with single AP such as, for example, different transmitters and/or sectors of the AP 104 (FIG. 1). In various embodiments the transmitters 710 and/or 720 can be associated with the same wireless network. In some embodiments, one or more transmitters 710 and/or 720 can be associated with a separate wireless network.

As shown in FIG. 7, one or more APs transmit beacons 740 on each transmitter 710 and/or 720. For example, the AP 254A can transmit a beacon 740 on the transmitter 710 and the AP 254B can transmit a beacon 740 on the transmitter 720. In some embodiments, the beacons 740 can define a plurality of reserved access windows (RAWs) 750. In other embodiments, the RAWs 750 can be defined in other ways such as, for example, stored as a predetermined value in a memory. In various embodiments, the transmitters 710 and/or 720 can at least partially synchronize and/or align the RAWs 750, for example using the beacons 740, backhaul communications, and/or other wireless messages.

In contrast to the time slots 550 described above with respect to FIG. 5, each RAW 750 can be associated with one or more compatible TXOP classes. For example, the beacons 740 can reserve the RAWs 750 only for TXOP Class 1 transmissions. In an embodiment, TXOP classes not associated with the RAWs 750 are not allowed. For example, the transmitters 710 and/or 720 can refrain from transmitting TXOP Class 2 transmissions during a RAW 750 reserved only for TXOP Class 1 transmissions. Thus, in some embodiments where for example there are no TXOP Class 1 transmissions, the medium may be underutilized.

Figure 8:
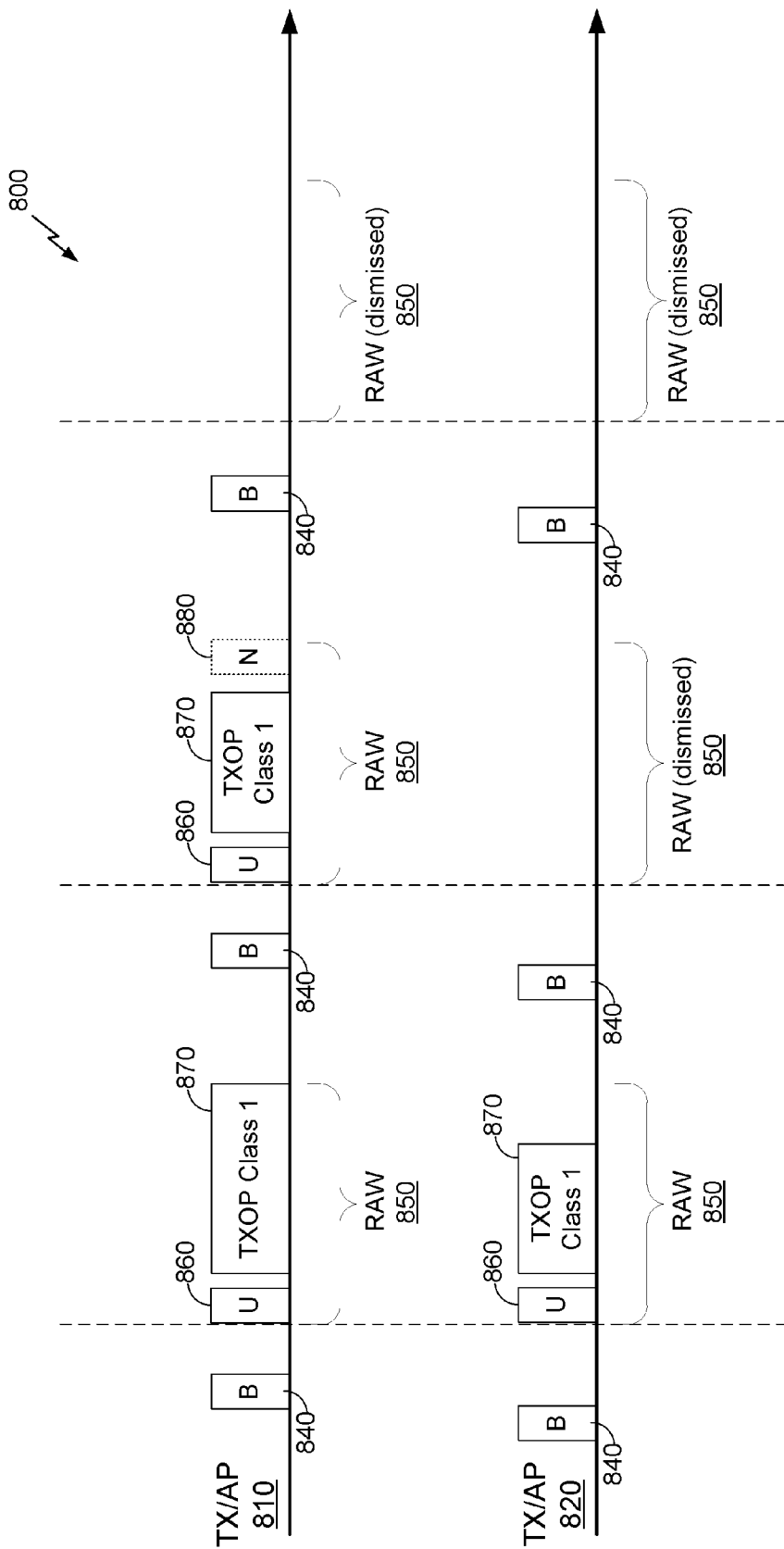
FIG. 8 shows another timing diagram in which aspects of the present disclosure may be employed.

FIG. 8 shows another timing diagram 800 in which aspects of the present disclosure may be employed. In particular, FIG. 8 shows a timing diagram 800 that may be used in accordance with a reserved access window (RAW) and usage indicator for scheduling group access to the wireless medium. As illustrated in FIG. 8, two transmitters are present: transmitter 810 and transmitter 820. Although three transmitters are shown, additional or fewer transmitters can be used. In various embodiments, each transmitter 810 and/or 820 can use the same or overlapping channels.

In some embodiments, each transmitter 810 and/or 820 can be associated with a separate AP such as, for example, the APs 254A-254B discussed above with respect to FIG. 3. In some embodiments, each transmitter 810 and/or 820 can be associated with single AP such as, for example, different transmitters and/or sectors of the AP 104 (FIG. 1). In various embodiments the transmitters 810 and/or 820 can be associated with the same wireless network. In some embodiments, one or more transmitters 810 and/or 820 can be associated with a separate wireless network.

As shown in FIG. 8, one or more APs transmit beacons 840 on each transmitter 810 and/or 820. For example, the AP 254A can transmit a beacon 840 on the transmitter 810 and the AP 254B can transmit a beacon 840 on the transmitter 820. In some embodiments, the beacons 840 can define a plurality of reserved access windows (RAWs) 850. In other embodiments, the RAWs 850 can be defined in other ways such as, for example, stored as a predetermined value in a memory. In various embodiments, the transmitters 810 and/or 820 can at least partially synchronize and/or align the RAWs 850, for example using the beacons 840, backhaul communications, and/or other wireless messages.

As discussed above with respect to the RAWs 750 of FIG. 7, each RAW 850 can be associated with one or more compatible TXOP classes. For example, the beacons 840 can reserve the RAWs 850 only for TXOP Class 1 transmissions. In contrast to the RAWs 750 of FIG. 7, TXOP classes not associated with the RAWs 850 may be allowed under certain circumstances, such as where a RAW 850 is not being utilized for an associated TXOP class.

For example, the transmitters 810 and/or 820 can be configured to transmit a usage indication 860 prior to beginning a transmission 870 during the RAW 750. The usage indication 860 can alert other transmitters that the RAW 750 is in use for an associated TXOP class. In an embodiment, transmitters 810 and/or 820 can refrain from transmitting for a TXOP class not associated with the RAW 750 when they receive the usage indication 860. On the other hand, when no usage indication 860 is received at the beginning of the RAW 850, the transmitters 810 and/or 820 can proceed to transmit for any TXOP class during the RAW 850. Thus, when no usage indication 860 is received within a threshold time of the start of the RAW 750, the RAW can be said to be a dismissed RAW 855

For example, the transmitters 810 and/or 820 can be configured to transmit a non-usage indication 880 after finishing the transmission 870 during the RAW 850. The non-usage indication 880 can alert other transmitters that the RAW 850 is no longer in use for an associated TXOP class. In an embodiment, transmitters 810 and/or 820 can refrain from transmitting for a TXOP class not associated with the RAW 750 before they receive the non-usage indication 880. On the other hand, when the non-usage indication 880 is received prior to the end of the RAW 750, the transmitters 810 and/or 820 can proceed to transmit for any TXOP class during the remaining portion of the RAW 850. Thus, when the non-usage indication 860 is received the remaining portion of the RAW 850 can be said to be dismissed. In various embodiments, the usage indication 860 and the non-usage indication 880 can be used alone or in combination with each other.

Figure 9:
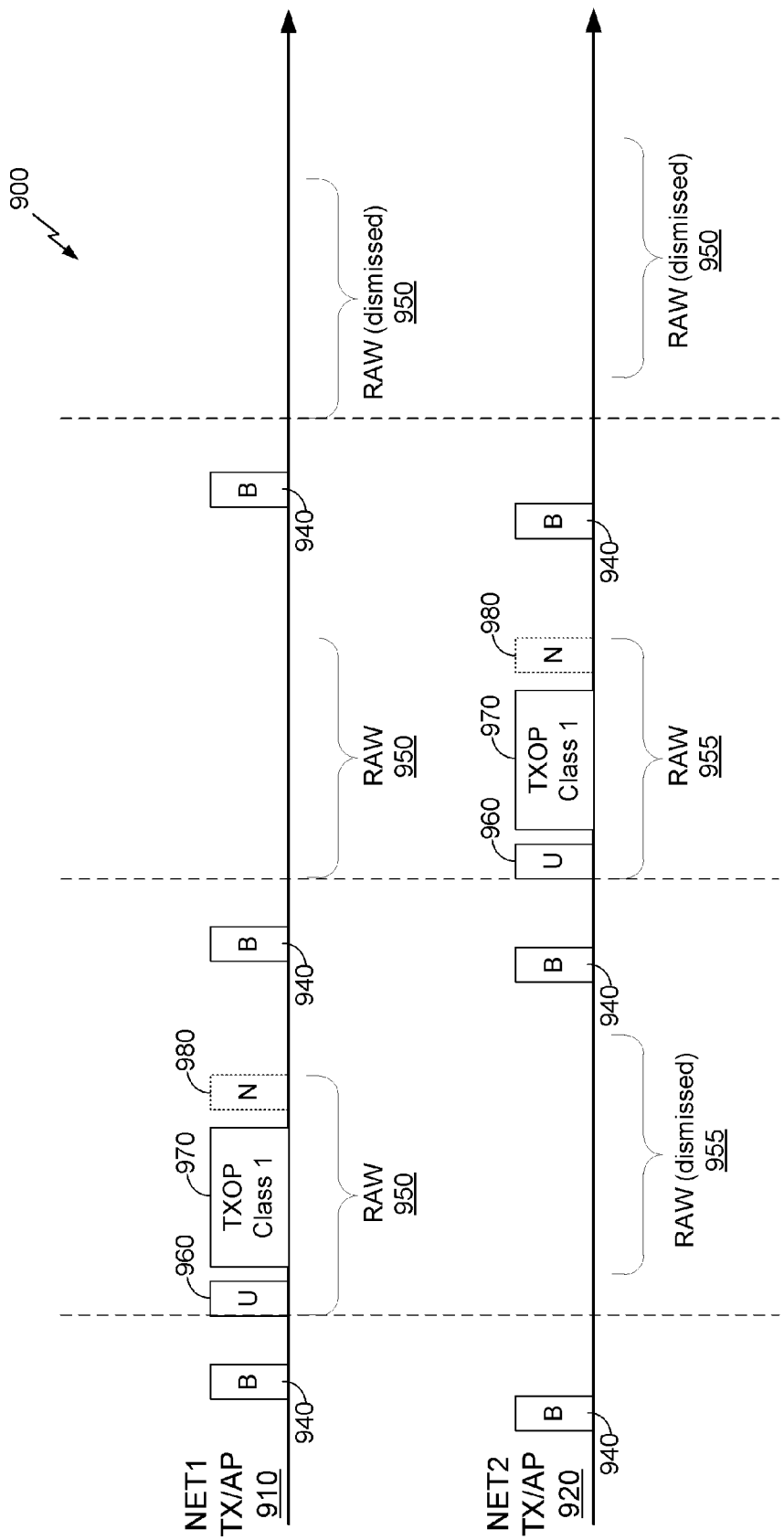
FIG. 9 shows another timing diagram in which aspects of the present disclosure may be employed.

FIG. 9 shows another timing diagram 900 in which aspects of the present disclosure may be employed. In particular, FIG. 9 shows a timing diagram 900 that may be used in accordance with a multi-network reserved access window (RAW) for scheduling group access to the wireless medium. As illustrated in FIG. 9, two transmitters are present: transmitter 910 and transmitter 920. Although three transmitters are shown, additional or fewer transmitters can be used. In various embodiments, each transmitter 910 and/or 920 can use the same or overlapping channels.

In some embodiments, each transmitter 910 and/or 920 can be associated with a separate AP such as, for example, the APs 254A-254B discussed above with respect to FIG. 3. In some embodiments, each transmitter 910 and/or 920 can be associated with single AP such as, for example, different transmitters and/or sectors of the AP 104 (FIG. 1). In the illustrated embodiment, the transmitters 910 and/or 920 are each associated with a separate wireless network.

As shown in FIG. 9, one or more APs transmit beacons 940 on each transmitter 910 and/or 920. For example, the AP 254A can transmit a beacon 940 on the transmitter 910 and the AP 254B can transmit a beacon 940 on the transmitter 920. In some embodiments, the beacons 940 can define a plurality of overlapping reserved access windows (RAWs) 950 and 955. In other embodiments, the RAWs 950 and 955 can be defined in other ways such as, for example, stored as a predetermined value in a memory. In various embodiments, the transmitters 910 and/or 920 can stagger the RAWs 950 and 955, for example using the beacons 940, backhaul communications, and/or other wireless messages. The RAWs 950 and 955 can be staggered such that usage indication frames 960 from different networks are sent at different times. In various embodiments, the staggering can be varied over time in order to give equal preference to each network. The RAWs 950 and 955 for each network can be associated with a separate TXOP class.

As discussed above with respect to the RAWs 750 of FIG. 7, each RAW 950 can be associated with one or more compatible TXOP classes. For example, the beacons 940 can reserve the RAWs 950 only for TXOP Class 1 transmissions. In contrast to the RAWs 750 of FIG. 7, TXOP classes not associated with the RAWs 950 may be allowed under certain circumstances, such as where a RAW 950 is not being utilized for an associated TXOP class.

For example, the transmitters 910 and/or 920 can be configured to transmit a usage indication frame 960 prior to beginning a transmission 970 during the RAW 950. The usage indication frame 960 can alert other transmitters that the RAW 950 is in use for an associated TXOP class. In an embodiment, transmitters 910 and/or 920 can refrain from transmitting for a TXOP class not associated with the RAW 950 when they receive the usage indication frame 960. On the other hand, when no usage indication frame 960 is received at the beginning of the RAW 950, the transmitters 910 and/or 920 can proceed to transmit for any TXOP class during the RAW 950. Thus, when no usage indication frame 960 is received within a threshold time of the start of the RAW 950, the RAW can be said to be a dismissed RAW 955.

For example, the transmitters 910 and/or 920 can be configured to transmit a non-usage indication 980 after finishing the transmission 970 during the RAW 950. The non-usage indication 980 can alert other transmitters that the RAW 950 is no longer in use for an associated TXOP class. In an embodiment, transmitters 910 and/or 920 can refrain from transmitting for a TXOP class not associated with the RAW 950 before they receive the non-usage indication 980. On the other hand, when the non-usage indication 980 is received prior to the end of the RAW 950, the transmitters 910 and/or 920 can proceed to transmit for any TXOP class during the remaining portion of the RAW 950. Thus, when the non-usage indication 980 is received the remaining portion of the RAW 950 can be said to be dismissed. In various embodiments, the usage indication frame 960 and the non-usage indication 980 can be used alone or in combination with each other.

Figure 10:
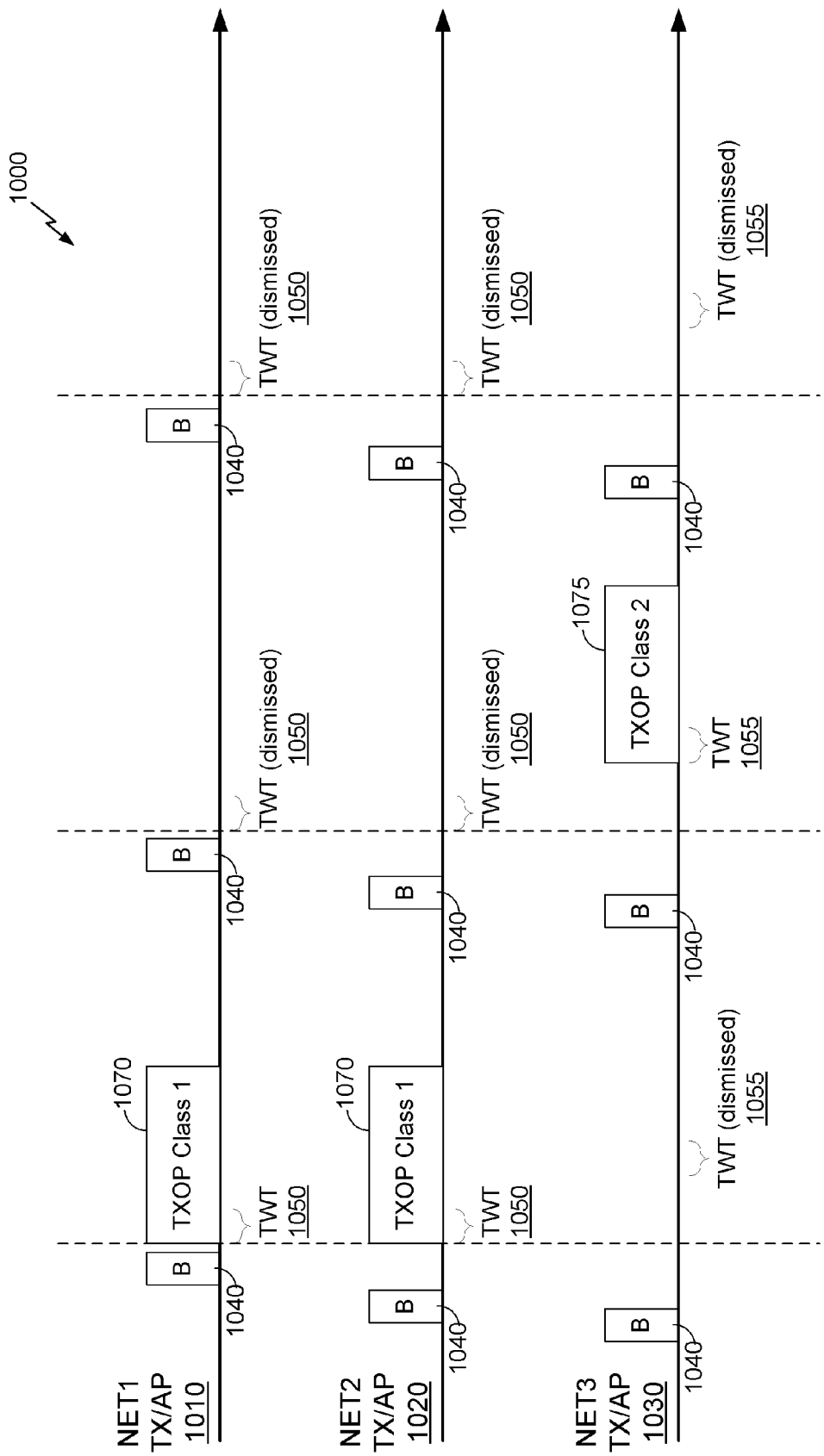
FIG. 10 shows another timing diagram in which aspects of the present disclosure may be employed.

FIG. 10 shows another timing diagram 1000 in which aspects of the present disclosure may be employed. In particular, FIG. 10 shows a timing diagram 1000 that may be used in accordance with a multi-network target wait time (TWT) for scheduling group access to the wireless medium. As illustrated in FIG. 10, three transmitters are present: transmitter 1010, transmitter 1020, and transmitter 1030. Although three transmitters are shown, additional or fewer transmitters can be used. In various embodiments, each transmitter 1010, 1020, and/or 1030 can use the same or overlapping channels.

In some embodiments, each transmitter 1010, 1020, and/or 1030 can be associated with a separate AP such as, for example, the APs 254A-254C discussed above with respect to FIG. 3. In some embodiments, each transmitter 1010, 1020, and/or 1030 can be associated with single AP such as, for example, different transmitters and/or sectors of the AP 104 (FIG. 1). In the illustrated embodiment, the transmitters 1010, 1020, and/or 1030 are each associated with a separate wireless network.

As shown in FIG. 10, one or more APs transmit beacons 1040 on each transmitter 1010, 1020, and/or 1030. For example, the AP 254A can transmit a beacon 1040 on the transmitter 1010, the AP 254B can transmit a beacon 1040 on the transmitter 1020, and so on. In some embodiments, the beacons 1040 can define a plurality of target wait times (TWTs) 1050 and 1055. In other embodiments, the TWTs 1050 and 1055 can be defined in other ways such as, for example, stored as a predetermined value in a memory. In various embodiments, the transmitters 1010, 1020, and/or 1030 can at least partially align the TWTs 1050 and 1055, for example using the beacons 1040, backhaul communications, and/or other wireless messages.

As discussed above with respect to the RAWs 750 of FIG. 7, each TWT 1050 and 1055 can be associated with one or more compatible TXOP classes. For example, the beacons 1040 can assign TWT 1050 for TXOP Class 1 transmissions and can assign TWT 1055 for TXOP Class 2 transmissions. In contrast to the RAWs 750 of FIG. 7, the TWTs 1050 and 1055 do not explicitly reserve the wireless medium for associated TXOP classes. Instead, they can indicate a wait time before a transmitter 1010, 1020, and/or 1030 attempts to transmit for the associated TXOP class.

For example, the transmitters 1010, 1020, and/or 1030 can be configured to wait until the TWT 1050 for TXOP Class 1 transmissions and to wait until the TWT 1055 for TXOP Class 2 transmissions. In the illustrated embodiment, the transmitters 1010 and 1020 have data for TXOP Class 1. Accordingly, they begin transmitting TXOP Class 1 transmissions 1070 at the TWT 1050.

In the illustrated embodiment, the transmitter 1030 has data for TXOP Class 2. Accordingly, the transmitter 1030 senses the medium at the TWT 1055. When the transmitters 1010 and 1020 are transmitting the TXOP Class 1 transmission 1070, the transmitter 1030 refrains from beginning a TXOP Class 2 transmission 1075. When the medium is clear at the next TWT 1055, the transmitter 1030 begins transmitting the TXOP Class 2 transmission 1075.

Figure 11:
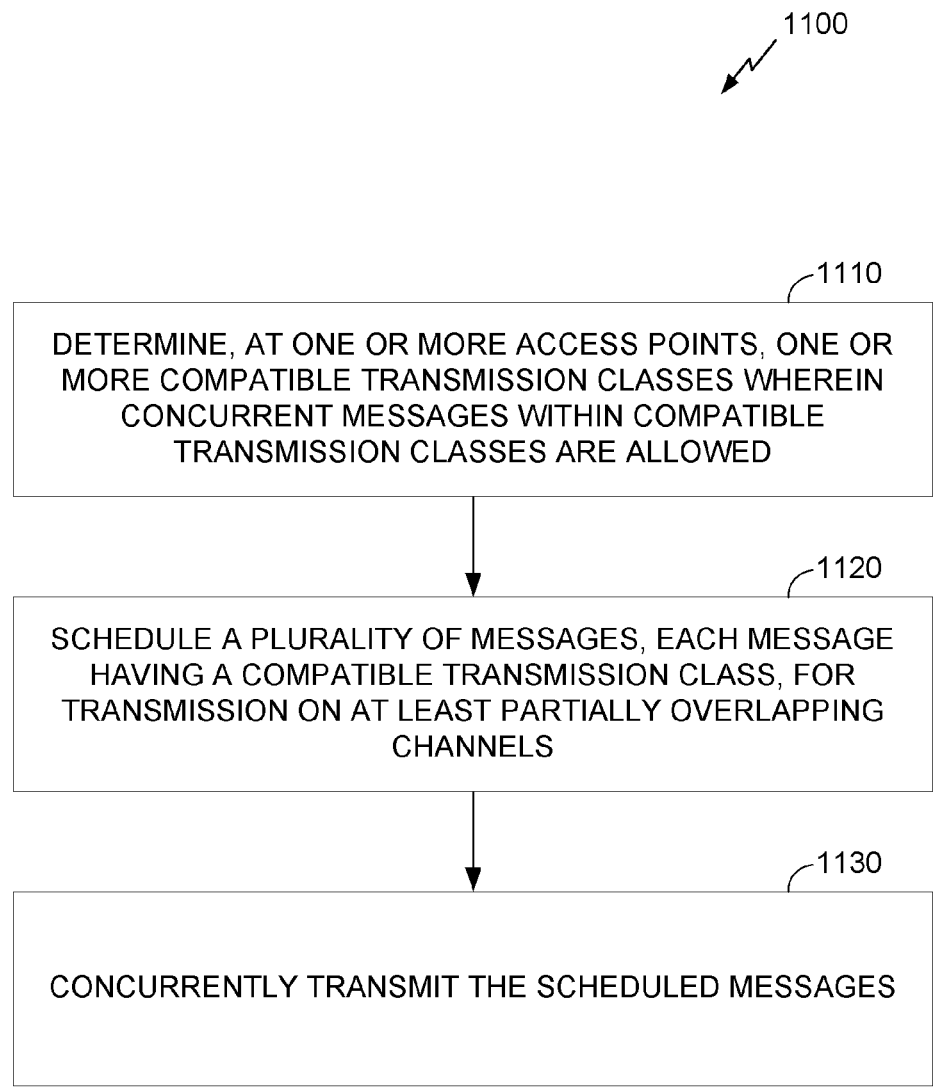
FIG. 11 is a flowchart of an exemplary method of wireless communication.

FIG. 11 is a flowchart 1100 of an exemplary method of wireless communication. Although the method of flowchart 1100 is described herein with reference to the wireless communication systems 100, 200, and 250 discussed above with respect to FIG. 3 and the wireless device 402 discussed above with respect to FIG. 4, a person having ordinary skill in the art will appreciate that the method of flowchart 1100 can be implemented by another device described herein, any other suitable device, or any combination of multiple devices. In an embodiment, one or more steps in flowchart 1100 can be performed by a processor or controller such as, for example, the AP GSC 154 and/or 156A-156D (FIG. 1) and/or the group scheduling controller 424 (FIG. 4). Although the method of flowchart 1100 is described herein with reference to a particular order, in various embodiments, blocks herein can be performed in a different order, or omitted, and additional blocks can be added.

First, at block 1110, the wireless device 402 determines one or more compatible transmission classes wherein concurrent messages within compatible transmission classes are allowed. For example, the AP 254A can determine that transmissions to the STA 256B will not (or is unlikely to) interfere with transmissions from the AP 254C to the STA 256H, for example because they are distant. Thus, the AP 254A can associate transmissions to the STAs 256B and 256H with a particular TXOP class (e.g., TXOP Class 1).

Next, at block 1120, the wireless device 402 can schedule a plurality of messages for transmission on at least partially overlapping channels. Each message can have a compatible transmission class. For example, the AP 254A can schedule a message for transmission to the STA 256B (which can be associated with TXOP Class 1) at least partially concurrently with a message for transmission from the AP 254C to the STA 256H (which can also be associated with TXOP Class 1). In some embodiments, separate APs can schedule the message transmissions. In some embodiments, a single AP can schedule the message transmissions (for example, one transmission per transmitter). Thus, although each message transmission might otherwise interfere (being on overlapping channels), the messages can be scheduled for concurrent transmission because they are associated with compatible transmission classes.

In various embodiments, the wireless device 402 can schedule the plurality of messages according to the slotted indexed mechanism described above with respect to the timing diagram 500 of FIG. 5. Particularly, the wireless device 402 can define a plurality of indexed time slots. Each time slot index can be associated with at least one compatible transmission class. The wireless device 402 can schedule the messages based on the time slots. For example, the transmitter 510 (FIG. 5) can schedule the TXOP Class 1 transmissions 560 for transmission beginning in time slot 550 index 1. As used herein, beginning at transmission can include one or more of: beginning actual transmission, attempting a failed or aborted transmission, and starting assessment of transmission capability.

In various embodiments, the wireless device 402 can perform a clear channel assessment and can selectively schedule or refrain from scheduling at least one message for transmission based on a result of the clear channel assessment. For example, the transmitter 510 (FIG. 5) can perform a clear channel assessment in time slot 550 index 1 for transmission of the TXOP Class 1 transmissions 560. If the channel is clear, the transmitter 510 can schedule message transmission in the subsequent time slot 550 (e.g., time slot 550 index 2).

The transmitter 530 (FIG. 5), for example, can also perform a clear channel assessment in time slot 550 index 2 for transmission of TXOP Class 2 transmissions 570. Where, as described above, transmission of the TXOP Class 1 transmission 560 has already begun during the clear channel assessment, the transmitter 530 can refrain from scheduling message transmission until the next time slot 550 index 2 when the channel is clear.

In various embodiments, the wireless device 402 can transmit a ready-to-send frame, and can receive a clear-to-send frame (in some embodiments within one time slot). For example, the transmitter 510 can transmit the short RTS frame 580 and can receive the short CTS frame 590 during as described above with respect to FIG. 5. If the channel is clear, as indicated by successful receipt of the short CTS frame 590, the transmitter 510 can schedule message transmission in the subsequent time slot 550 (e.g., time slot 550 index 2).

The transmitter 530, for example, can also receive the short RTS frame 580 and/or the short CTS frame 590 while preparing for transmission of TXOP Class 2 transmissions 570 in time slot 550 index 2, as described above with respect to FIG. 5. Thus, the transmitter 530 can refrain from scheduling message transmission until the next time slot 550 index 2 when the channel is clear.

In various embodiments, the wireless device 402 can schedule the plurality of messages according to the slotted mechanism with backoff described above with respect to the timing diagram 600 of FIG. 6. Particularly, the wireless device 402 can define a plurality of indexed time slots. The wireless device 402 can further define a plurality of backoff periods, each backoff period associated with at least one compatible transmission class. The wireless device 402 can further contend for transmission (e.g., to determine a priority class of compatible transmissions) based on at least one backoff period associated with the transmission class of at least one message. For example, when the transmitter 610 has a TXOP Class 1 transmission 660, it can contend during the time slots 650 based on the TXOP Class 1 backoff period 680. Similarly, when the transmitter 620 has a TXOP Class 2 transmission 670, it can contend during the time slots 650 based on the TXOP Class 2 backoff period 685. Because the TXOP Class 1 backoff period 680 is shorter than the TXOP Class 2 backoff period 685, the TXOP Class 1 transmissions 670 can win the contention.

In various embodiments, the wireless device 402 can schedule the plurality of messages according to the reserved access window (RAW) described above with respect to the timing diagram 700 of FIG. 7. Particularly, the wireless device 402 can define a reserved access window associated with at least one compatible transmission class. The wireless device 402 can further transmit only messages having a transmission class associated with the reserved access window during the reserved access window, and can refrain from transmitting messages not having a transmission class associated with the reserved access window during the reserved access window. For example, the transmitter 710 can transmit the beacon 740 defining a RAW 750 for TXOP Class 1 transmission. During the RAW 750, the transmitter 710 can transmit TXOP Class 1 transmissions, and can refrain from transmitting TXOP Class 2 transmissions.

In various embodiments, the wireless device 402 can schedule the plurality of messages according to the reserved access window (RAW) and usage indication described above with respect to the timing diagram 800 of FIG. 8. Particularly, the wireless device 402 can define a reserved access window associated with at least one compatible transmission class. The wireless device 402 can further transmit a usage indicator for the reserved access window prior to transmitting the scheduled messages. The wireless device 402 can further transmit messages having a transmission class associated with the reserved access window during the reserved access window, and can refrain from transmitting messages not having a transmission class associated with the reserved access window after receiving the usage indicator. For example, the transmitter 810 can transmit the beacon 840 defining a RAW 850 for TXOP Class 1 transmission. During the RAW 850, the transmitter 810 can transmit the usage indicator 860. The transmitter 820 can refrain from transmitting TXOP Class 2 transmissions during RAWs 850 in which the usage indicator 860 has been transmitted.

In various embodiments, the wireless device 402 can transmit a non-usage indicator for the reserved access window after transmitting the scheduled messages. The wireless device 402 can refrain from transmitting messages not having a transmission class associated with the reserved access window until receiving the usage indicator. For example, the transmitter 810 can transmit the beacon 840 defining a RAW 850 for TXOP Class 1 transmission. After transmitting the transmission 870, the transmitter 810 can transmit the non-usage indication 880. The transmitter 820 can refrain from transmitting TXOP Class 2 transmissions during RAWs 850 until receiving the non-usage indication 880.

In various embodiments, the wireless device 402 can schedule the plurality of messages according to the staggered reserved access windows (RAWs) scheduling described above with respect to the timing diagram 900 of FIG. 9. Particularly, the wireless device 402 can define a plurality of staggered reserved access windows, each associated with a separate transmission class. For example, the transmitter 910 can transmit a beacon 940 defining a RAW 950 for TXOP Class 1 transmission. The transmitter 920 can transmit a beacon 940 defining a staggered RAW 950, having a different start time, for TXOP Class 2 transmission.

In various embodiments, the wireless device 402 can schedule the plurality of messages according to the target wait time (e.g., which may be predetermined in one embodiment) scheduling described above with respect to the timing diagram 1000 of FIG. 10. Particularly, the wireless device 402 can define a target wait time associated with a compatible transmission class, and can wait until the target wait time associated with the transmission class of the messages and sensing the wireless medium before transmitting the messages. For example, the transmitter 1010 can transmit a beacon 1040 defining a TWT 1050 for TXOP Class 1 transmission and/or a TWT 1055 for TXOP Class 2 transmission. The transmitter 1020 can wait until the TWT 1050 to transmit the TXOP Class 1 transmission 1070. The transmitter 1020 can wait until the TWT 1055 to transmit the TXOP Class 2 transmission 1080.

Then, at block 1130, the wireless device 402 concurrently transmits the scheduled messages. For example, the wireless device 402 can concurrently transmit any of the messages and/or transmissions 560, 570, 660, 670, 870, 970, and 1070 described above with respect to FIGS. 5-10. As discussed herein, in various embodiments, the wireless device 402 can transmit one of the messages concurrent with transmission of another message by a different device or transmitter.

Figure 12:
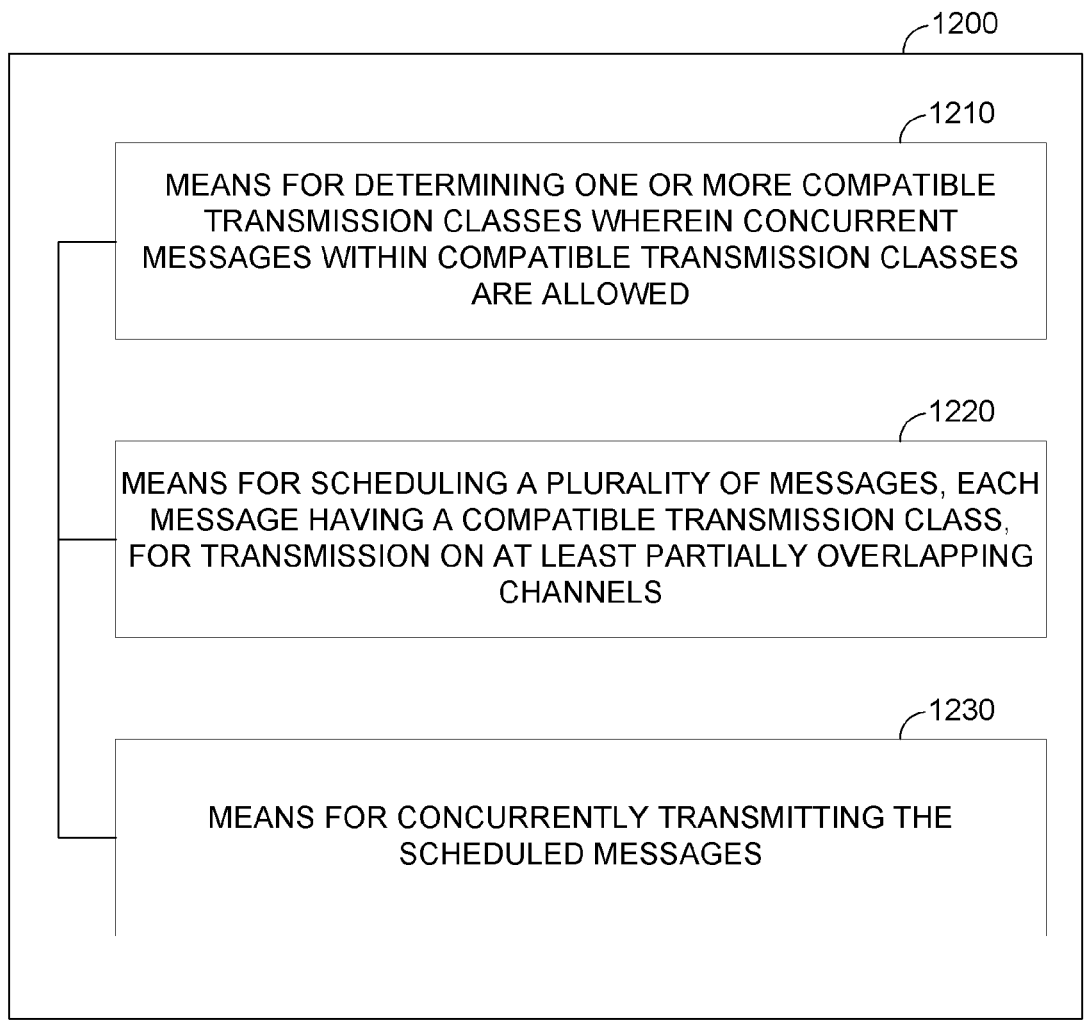
FIG. 12 is a functional block diagram of an apparatus for wireless communication.

FIG. 12 is a functional block diagram of an apparatus 1200 for wireless communication. Those skilled in the art will appreciate that an apparatus for detecting wireless communication can have more components than the simplified apparatus 1200 shown in FIG. 12. The apparatus 1200 for wireless communication shown includes only those components useful for describing some prominent features of implementations within the scope of the claims. The apparatus 1200 for wireless communication includes means 1210 for determining one or more compatible transmission classes, means 1220 for scheduling a plurality of messages, each message in a compatible transmission class, for transmission on at least partially overlapping channels, and means 1230 for concurrently transmitting the scheduled messages. In various embodiments, the apparatus 1200 can further include means for performing any other block or function described herein.

In an embodiment, means 1210 for determining one or more compatible transmission classes can be configured to perform one or more of the functions described above with respect to block 1110 (FIG. 11). In various embodiments, the means 1210 for determining one or more compatible transmission classes can be implemented by one or more of the processor 404 (FIG. 4), the memory 406 (FIG. 4), the signal detector 418 (FIG. 4), the DSP 420 (FIG. 4), the group scheduling controller 424 (FIG. 4), or any combination of other processors, DSPs, and/or controllers.

In an embodiment, means 1220 for scheduling a plurality of messages can be configured to perform one or more of the functions described above with respect to block 1120 (FIG. 11). In various embodiments, the means 1220 for scheduling a plurality of messages can be implemented by one or more of the processor 404 (FIG. 4), the memory 406 (FIG. 4), the signal detector 418 (FIG. 4), the DSP 420 (FIG. 4), the group scheduling controller 424 (FIG. 4), or any combination of other processors, DSPs, and/or controllers.

In an embodiment, means 1230 for concurrently transmitting the scheduled messages can be configured to perform one or more of the functions described above with respect to block 1130 (FIG. 11). In various embodiments, the means 1230 for concurrently transmitting the scheduled messages can be implemented by one or more of the processor 404 (FIG. 4), the memory 406 (FIG. 4), the signal detector 418 (FIG. 4), the DSP 420 (FIG. 4), the group scheduling controller 424 (FIG. 4), the transmitter 410 (FIG. 4), the transceiver 414 (FIG. 4), and/or the antenna 416 (FIG. 4).

Figure 13:
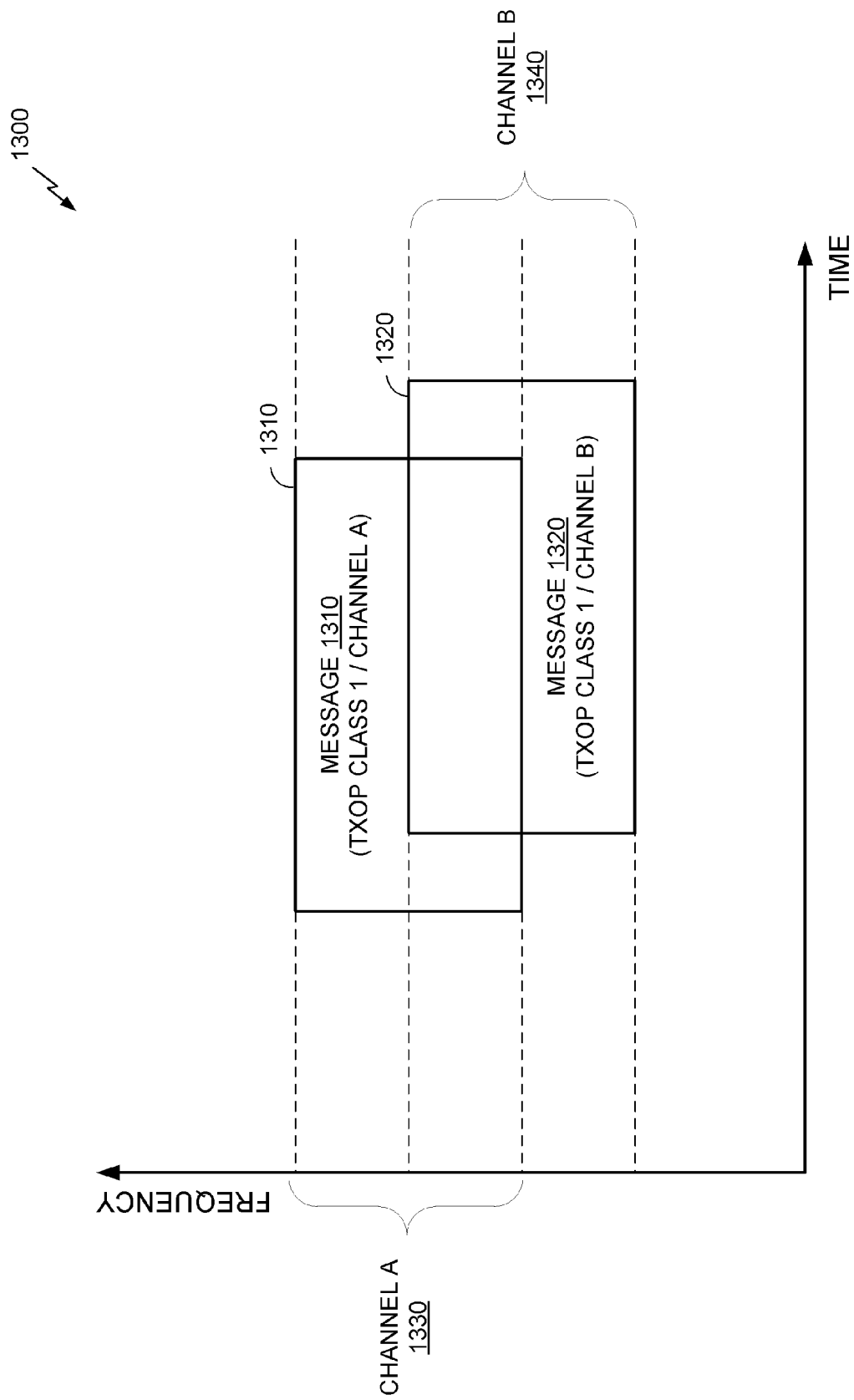
FIG. 13 is a graph showing concurrent message transmission on overlapping channels, according to one embodiment.

FIG. 13 is a graph 1300 showing concurrent message transmission on overlapping channels, according to one embodiment. The graph 1300 shows time along the x-axis and frequency along the y-axis. As shown in FIG. 13, two messages 1310 and 1320 are transmitted concurrently on overlapping channels 1330 and 1340. The messages 1310 and 1320 can be transmitted as discussed above with respect to FIGS. 5-12. For example, the message 1310 can be the TXOP class 1 transmission 560 transmitted by the transmitter 510 shown in FIG. 5. The message 1320 can be a different TXOP class 1 transmission 560 transmitted by the transmitter 520 shown in FIG. 5.

As described herein, various messages are transmitted concurrently and on overlapping channels. Concurrent transmissions include messages that at least partially overlap in transmission time. Concurrent transmissions need not, however, start or end at the same time. Overlapping channels include channels that are identical and also channels that share at least some physical or logical resources. As shown in FIG. 13, the channels 1330 and 1340 are defined by frequency. A person having ordinary skill in the art will appreciate that channels can include any multiple access technology including, for example, frequency division multiple access (FDMA), time division multiple access (TDMA), code division multiple access (CDMA), OFDM, DSSS, etc.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication, comprising:
   determining, by an access point, one or more classes of compatible transmissions from one or more wireless devices;
   defining, by the access point, scheduled time slots for each of the one or more classes;
   defining, by the access point, a channel access procedure associated with each of the scheduled time slots; and
   synchronizing, with another access point, the scheduled time slots for each of the one or more classes of compatible transmissions;
   accessing, by the access point, a wireless medium during an associated scheduled time slot according to the channel access procedure.

2. The method of claim 1, wherein the classes comprise one or more of downlink transmissions or uplink transmissions.

3. The method of claim 1, wherein one of the classes comprises transmissions that can be correctly received concurrently.

4. The method of claim 1, wherein determining the one or more classes is based on one or more of: receiving information from one or more of the one or more wireless devices, the information being related to one or more of a level of wireless device interference or a network topology; a broadcast of class definitions in a beacon; and an association response frame.

5. The method of claim 1, wherein the wireless medium comprises one or more channels, and the method further comprises scheduling transmission of the compatible transmissions of the one or more classes on the same channel.

6. The method of claim 1, wherein defining the scheduled time slots comprises defining intervals of time indexed in a periodic pattern.

7. The method of claim 1, wherein defining the channel access procedure comprises determining whether to allow or restrict concurrent transmissions during the associated scheduled time slot.

8. The method of claim 7, wherein the determination of whether to allow or restrict concurrent transmissions is based on a location of one or more of the one or more wireless devices.

9. The method of claim 8, further comprising:
determining to restrict concurrent transmissions during the associated scheduled time slot if the one or more of the one or more wireless devices is located at or near an edge of a basic service area; and
determining to allow concurrent transmissions during the associated scheduled time slot if the one or more of the one or more wireless devices is located at or near a center of a basic service area.

10. The method of claim 1, wherein accessing the wireless medium comprises performing a clear channel assessment procedure during the associated scheduled time slot, and the method further comprises selectively scheduling or refraining from scheduling at least one message for transmission based on a result of the clear channel assessment.

11. The method of claim 10, wherein the performance of the clear channel assessment procedure starts at a beginning of the associated scheduled time slot, and the method further comprises performing a backoff procedure according to a backoff value specific to the scheduled time slot, the backoff value being initialized to a first value at the beginning of the associated scheduled time slot, and the backoff value being decremented while an associated channel is assessed to be idle.

12. The method of claim 11, wherein the first value is random or is based on one or more of a function of a class associated with the scheduled time slot or a residual value of a previous backoff value associated with a previous scheduled time slot assigned to the associated class.

13. The method of claim 1, wherein accessing the wireless medium comprises:
performing a clear channel assessment procedure at a first frame of the associated scheduled time slot;
transmitting a ready-to-send frame at a second frame of the associated scheduled time slot;
receiving a clear-to-send frame at a third frame of the associated scheduled time slot; and
selectively scheduling or refraining from scheduling at least one message for transmission based on a result of one or more of the clear channel assessment, the ready-to-send frame, and the clear-to-send frame.

14. The method of claim 1, wherein accessing the wireless medium comprises receiving a ready-to-send frame or a clear-to-send frame during the associated scheduled time slot, and the method further comprises scheduling or refraining from scheduling at least one transmission based on said receiving.

15. The method of claim 1, further comprising:
during each of the scheduled time slots, initiating transmission of only messages being associated with a class associated with the scheduled time slot; and
refraining from initiating transmission of messages being associated with a class not associated with the scheduled time slot during the scheduled time slot.

16. The method of claim 1, wherein each of the scheduled time slots comprises a length equivalent to one point coordination function interframe space.

17. The method of claim 1, further comprising defining a plurality of backoff periods, each backoff period associated with at least one of the classes of compatible transmissions, wherein defining the channel access procedure comprises determining a priority class of compatible transmissions based on a comparison of one or more of the backoff periods, and wherein accessing the wireless medium comprises starting or resuming transmission of messages being associated with the priority class based on the comparison.

18. The method of claim 1, further comprising:
defining a reserved access window during one or more of the scheduled time slots, the reserved access window being associated with at least one of the classes of compatible transmissions; and
during the reserved access window, initiating transmission of only messages being associated with a class associated with the reserved access window or refraining from initiating transmission of messages not being associated with the class associated with the reserved access window.

19. The method of claim 18, further comprising:
transmitting an indicator for the reserved access window, wherein the transmitting occurs prior to transmitting one or more messages if the indicator is a usage indicator, and wherein the transmitting occurs after transmitting one or more messages if the indicator is a non-usage indicator; and
transmitting or refraining from transmitting one or more messages based on the indicator and whether the one or more messages are associated with a class associated with the reserved access window.

20. The method of claim 1, further comprising defining a plurality of staggered reserved access windows, each associated with a separate transmission class.

21. The method of claim 1, further comprising:
waiting until a predetermined target wait time associated with one of the classes;
determining an idle status of the wireless medium after the predetermined target wait time; and
scheduling transmission of messages associated with the class based on the idle status.

22. A device An access point configured for wireless communication, comprising:
a processor configured to:
determine one or more classes of compatible transmissions from one or more wireless devices;
define scheduled time slots for each of the one or more classes;

define a channel access procedure associated with each of the scheduled time slots;
synchronize, with another access point, the scheduled time slots for each of the one or more classes of compatible transmissions; and
access a wireless medium during an associated scheduled time slot according to the channel access procedure.

23. The device of claim 22, wherein the classes comprise one or more of downlink transmissions.

24. The device of claim 22, wherein one of the classes comprises transmissions that can be correctly received concurrently.

25. The device of claim 22, wherein the processor determines the one or more classes based on one or more of: receiving information from one or more of the one or more wireless devices, the information being related to one or more of a level of wireless device interference or a network topology; a broadcast of class definitions in a beacon; and an association response frame.

26. The device of claim 22, wherein the wireless medium comprises one or more channels, and the processor is further configured to schedule transmission of the compatible transmissions of the one or more classes on the same channel.

27. The device of claim 22, wherein the processor defines the scheduled time slots based on being further configured to define intervals of time indexed in a periodic pattern.

28. The device of claim 22, wherein the processor defines the channel access procedure based on being further configured to determine whether to allow or restrict concurrent transmissions during the associated scheduled time slot.

29. The device of claim 28, wherein the processor determines whether to allow or restrict concurrent transmissions based on a location of one or more of the one or more wireless devices.

30. The device of claim 29, wherein the processor is further configured to:
determine to restrict concurrent transmissions during the associated scheduled time slot if the one or more of the one or more wireless devices is located at or near an edge of a basic service area; and
determine to allow concurrent transmissions during the associated scheduled time slot if the one or more of the one or more wireless devices is located at or near a center of a basic service area.

31. The device of claim 22, wherein the processor is further configured to:
access the wireless medium based on performing a clear channel assessment procedure during the associated scheduled time slot; and
selectively schedule or refrain from scheduling at least one message for transmission based on a result of the clear channel assessment.

32. The device of claim 31, wherein the processor is further configured to:
start the performance of the clear channel assessment at a beginning of the associated scheduled time slot; and
perform a backoff procedure according to a backoff value specific to the scheduled time slot, the backoff value being initialized to a first value at the beginning of the associated scheduled time slot, and the backoff value being decremented while an associated channel is assessed to be idle.

33. The device of claim 32, wherein the first value is random or is based on one or more of a function of a class associated with the scheduled time slot or a residual value of a previous backoff value a previous scheduled time slot assigned to the associated class.

34. The device of claim 22, wherein the processor accesses the wireless medium based on being further configured to:
perform a clear channel assessment procedure at a first frame of the associated scheduled time slot;
transmit a ready-to-send frame at a second frame of the associated scheduled time slot;
receive a clear-to-send frame at a third frame of the associated scheduled time slot; and
selectively schedule or refrain from scheduling at least one message for transmission based on a result of one or more of the clear channel assessment, the ready-to-send frame, and the clear-to-send frame.

35. The device of claim 22, wherein the processor accesses the wireless medium based on being further configured to:
receive a ready-to-send frame or a clear-to-send frame during the associated scheduled time slot; and
schedule or refrain from scheduling at least one transmission based on said receiving.

36. The device of claim 22, wherein the processor is further configured to:
during each of the scheduled time slots, initiate transmission of only messages being associated with a class associated with the scheduled time slot; and
refrain from initiating transmission of messages being associated with a class not associated with the scheduled time slot during the scheduled time slot.

37. The device of claim 22, wherein each of the scheduled time slots comprises a length equivalent to one point coordination function interframe space.

38. The device of claim 22, wherein the processor is further configured to define a plurality of backoff periods, each backoff period associated with at least one of the classes of compatible transmissions, wherein the processor defines the channel access procedure based on being further configured to determine a priority class of compatible transmissions based on a comparison of one or more of the backoff periods, and wherein the processor accesses the wireless medium based on being further configured to start or resume transmission of messages being associated with the priority class based on the comparison.

39. The device of claim 22, wherein the processor is further configured to:
define a reserved access window during one or more of the scheduled time slots, the reserved access window being associated with at least one of the classes of compatible transmissions; and
during the reserved access window, initiate transmission of only messages being associated with a class associated with the reserved access window or refrain from initiating transmission of messages not being associated with the class associated with the reserved access window.

40. The device of claim 39, the processor being further configured to:
transmit an indicator for the reserved access window, wherein the processor transmits the indicator prior to transmitting one or more messages if the indicator is a usage indicator, and wherein the processor transmits the indicator after transmitting one or more messages if the indicator is a non-usage indicator; and
transmit or refrain from transmitting one or more messages based on the indicator and whether the one or more messages are associated with a class associated with the reserved access window.

41. The device of claim 22, wherein the processor is further configured to define a plurality of staggered reserved access windows, each associated with a separate transmission class.

42. The device of claim 22, wherein the processor is further configured to:
wait until a predetermined target wait time associated with one of the classes;
determine an idle status of the wireless medium after the predetermined target wait time; and
schedule transmission of messages associated with the class based on the idle status.

43. An access point for wireless communication, comprising:
means for determining one or more classes of compatible transmissions from one or more wireless devices;
means for defining scheduled time slots for each of the one or more classes;
means for defining a channel access procedure associated with each of the scheduled time slots;
means for synchronizing, with another access point, the scheduled time slots for each of the one or more classes of compatible transmissions; and
means for accessing a wireless medium during an associated scheduled time slot according to the channel access procedure.

44. A non-transitory computer-readable medium comprising code that, when executed on one or more processors, causes an access point to:
determine one or more classes of compatible transmissions from one or more wireless devices;
define scheduled time slots for each of the one or more classes;
define a channel access procedure associated with each of the scheduled time slots;
synchronize, with another access point, the scheduled time slots for each of the one or more classes of compatible transmissions; and
access a wireless medium during an associated scheduled time slot according to the channel access procedure.

45. The method of claim 1, wherein synchronizing, with another access point, the scheduled time slots for each of the one or more classes of compatible transmissions comprises receiving indications of time slots for the classes of transmission from the other access point and transmitting the classes during the indicated time slots.

46. The method of claim 45, further comprises receiving, by the access point, a beacon from the other access point, the beacon providing the indications of time slots for the classes of transmission from the other access point.

47. The method of claim 1, wherein defining, by the access point, a channel access procedure associated with each of the scheduled time slots comprises defining different clear channel assessment back-off periods for different scheduled time slots.

* * * * *